L. A. SUBERS.
AUTOMATIC MACHINE FOR MAKING TUBULAR FABRIC.
APPLICATION FILED NOV. 14, 1910. RENEWED MAR. 10, 1913.
1,145,446.
Patented July 6, 1915.
15 SHEETS—SHEET 1.
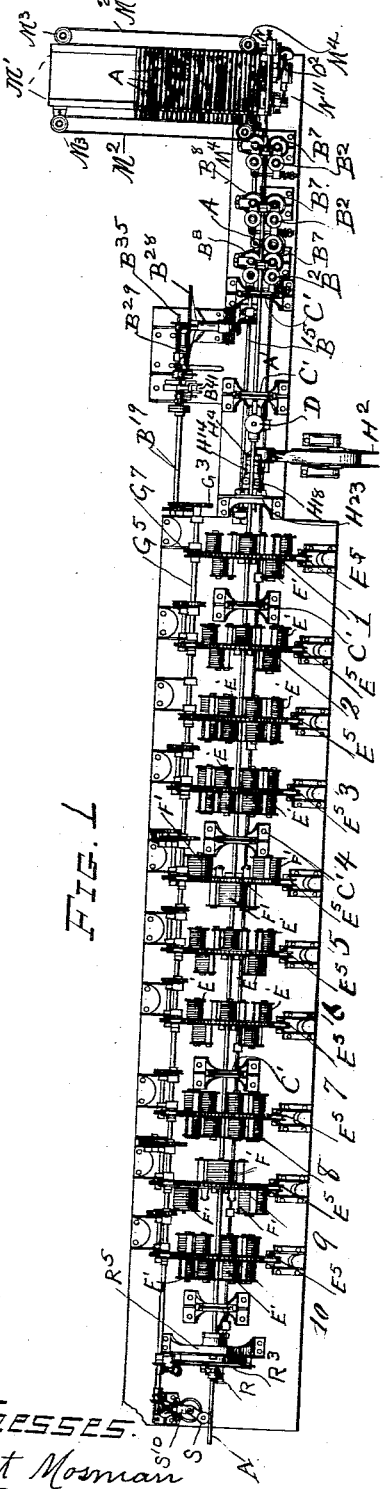

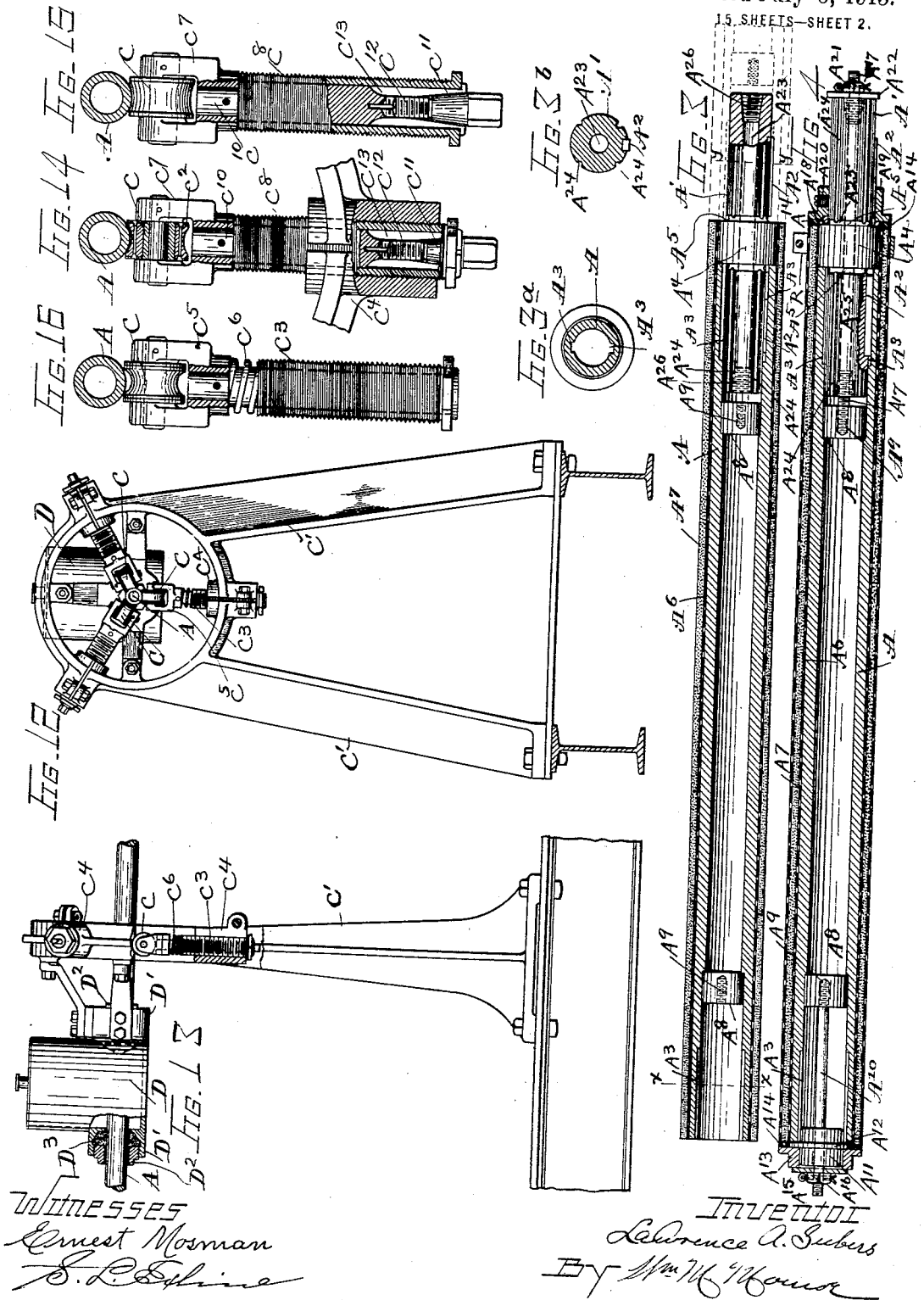

L. A. SUBERS.
AUTOMATIC MACHINE FOR MAKING TUBULAR FABRIC.
APPLICATION FILED NOV. 14, 1910. RENEWED MAR. 10, 1913.
1,145,446.
Patented July 6, 1915.
15 SHEETS—SHEET 3.
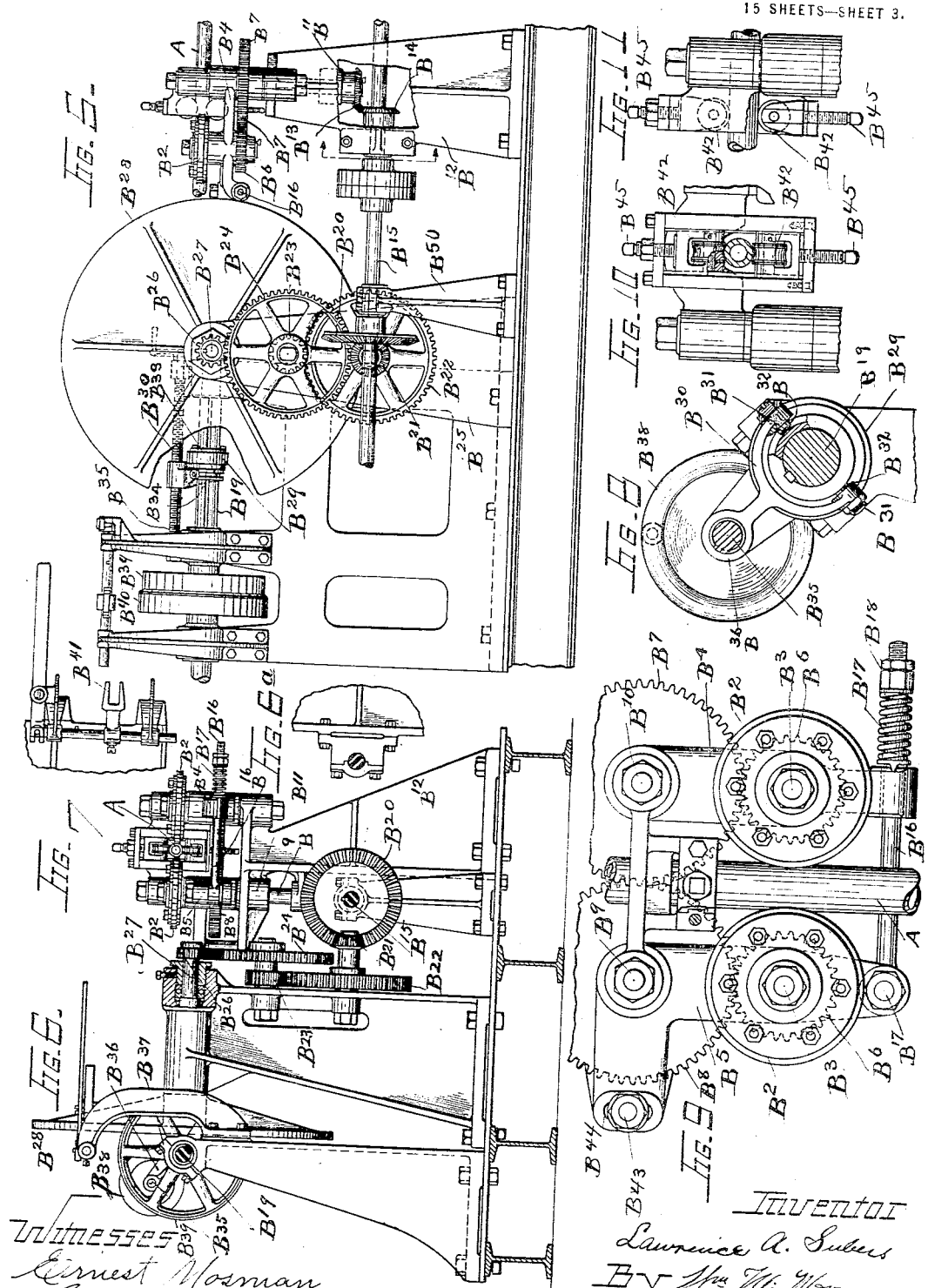

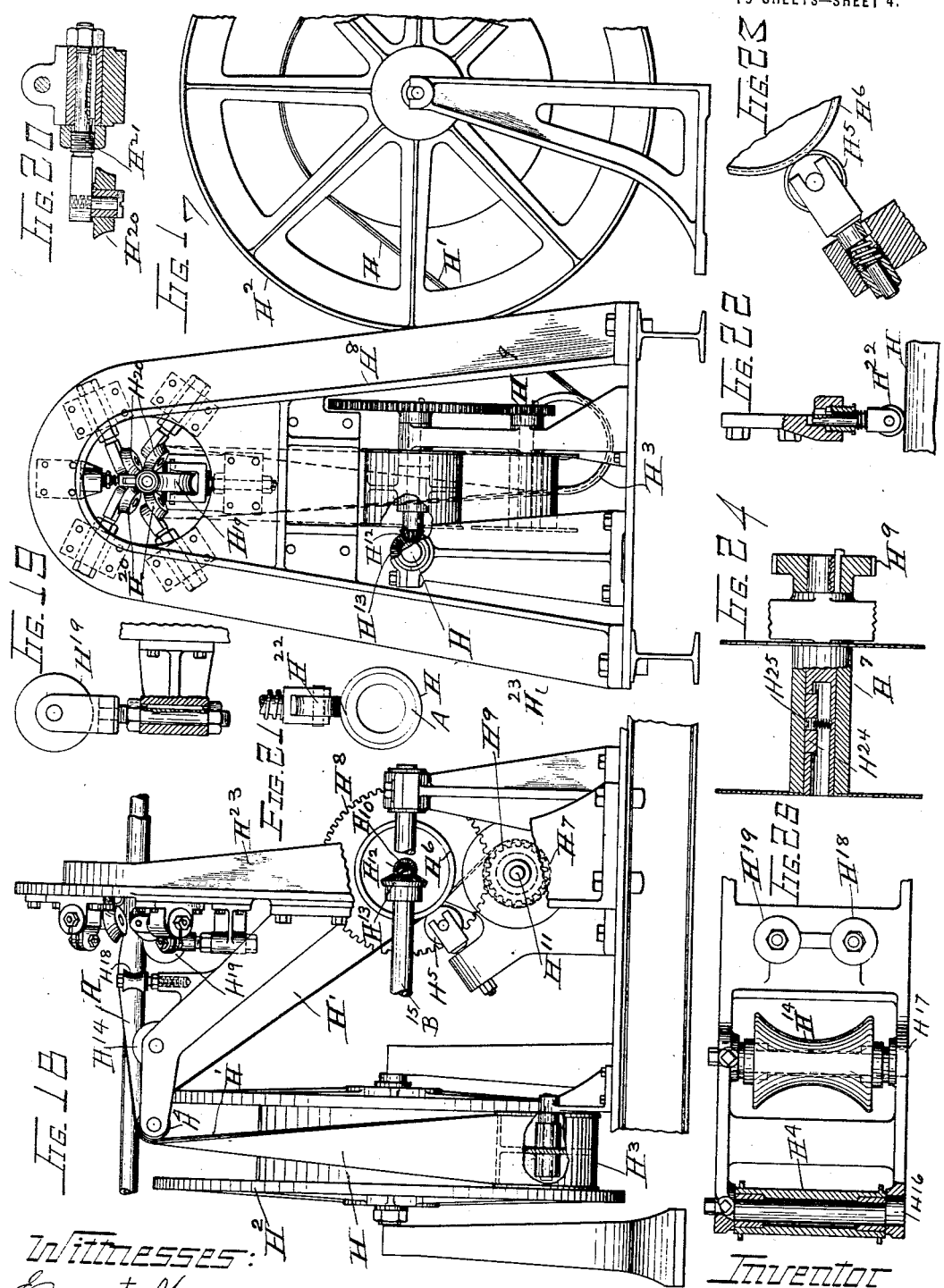

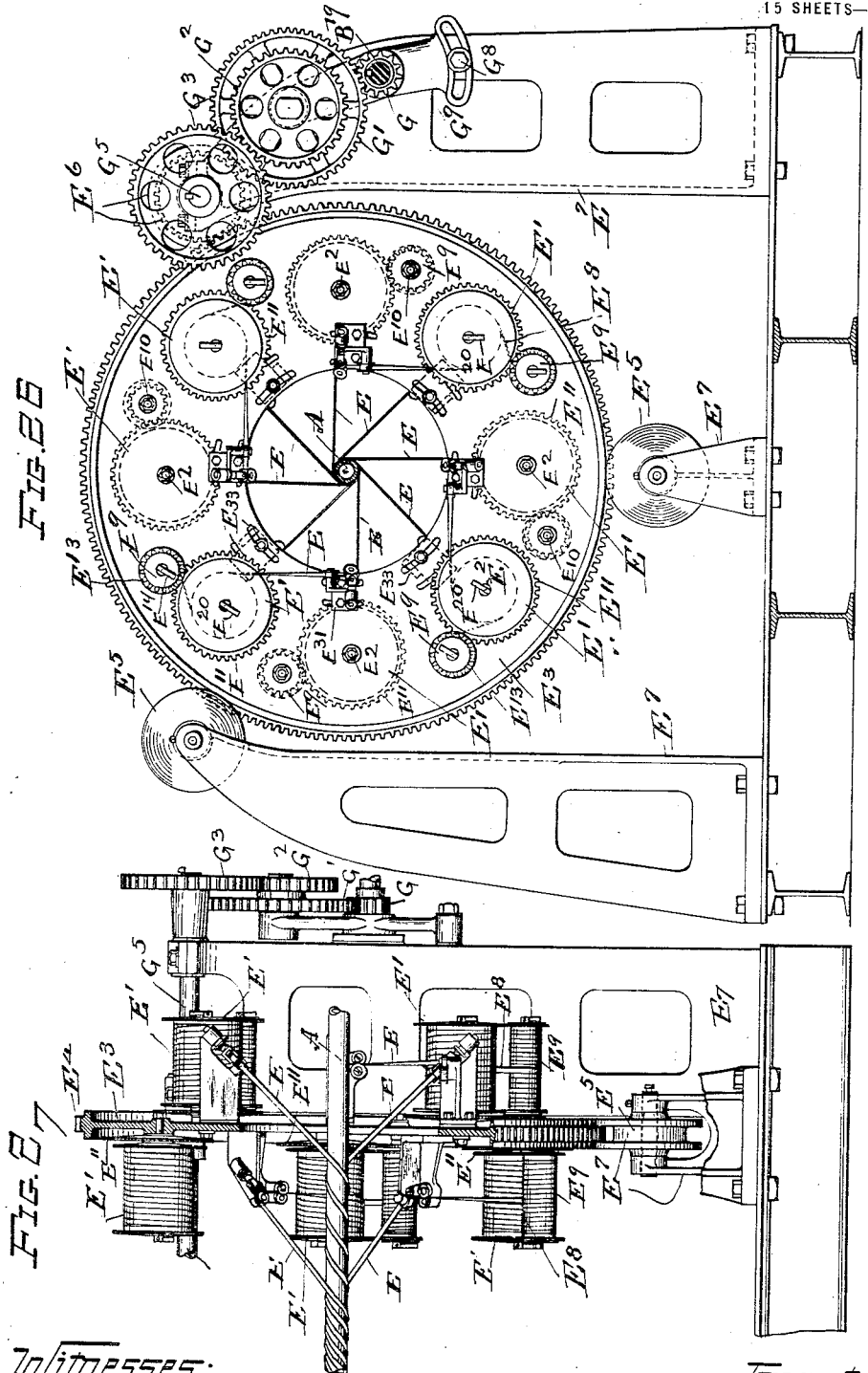

L. A. SUBERS.
AUTOMATIC MACHINE FOR MAKING TUBULAR FABRIC.
APPLICATION FILED NOV. 14, 1910. RENEWED MAR. 10, 1913.
1,145,446.
Patented July 6, 1915.
15 SHEETS—SHEET 6.
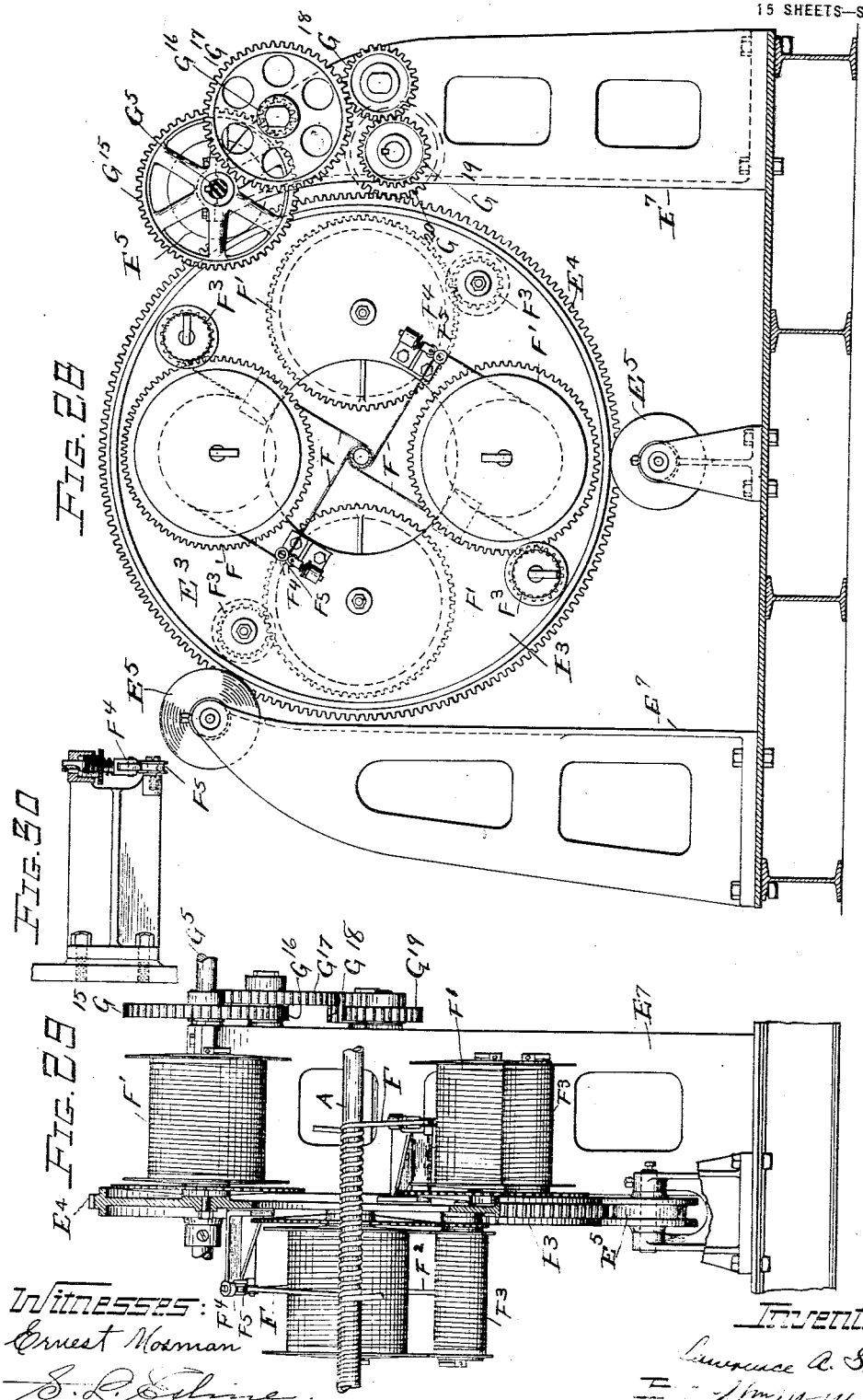

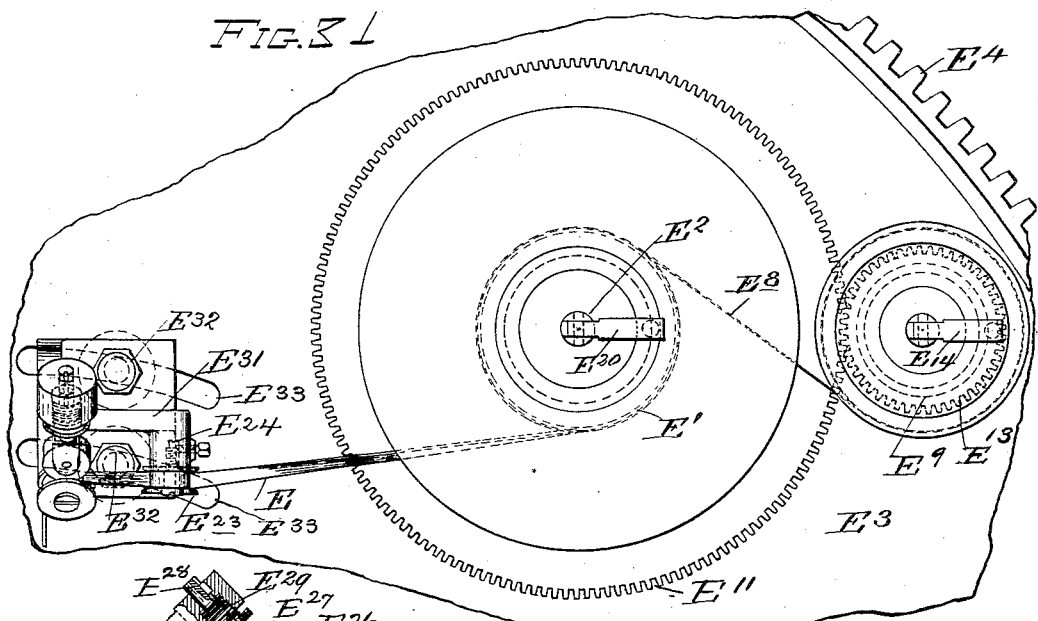
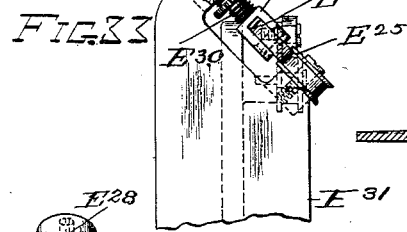
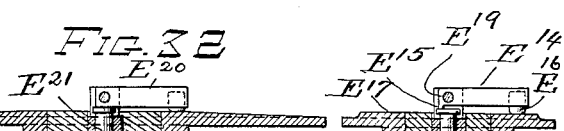
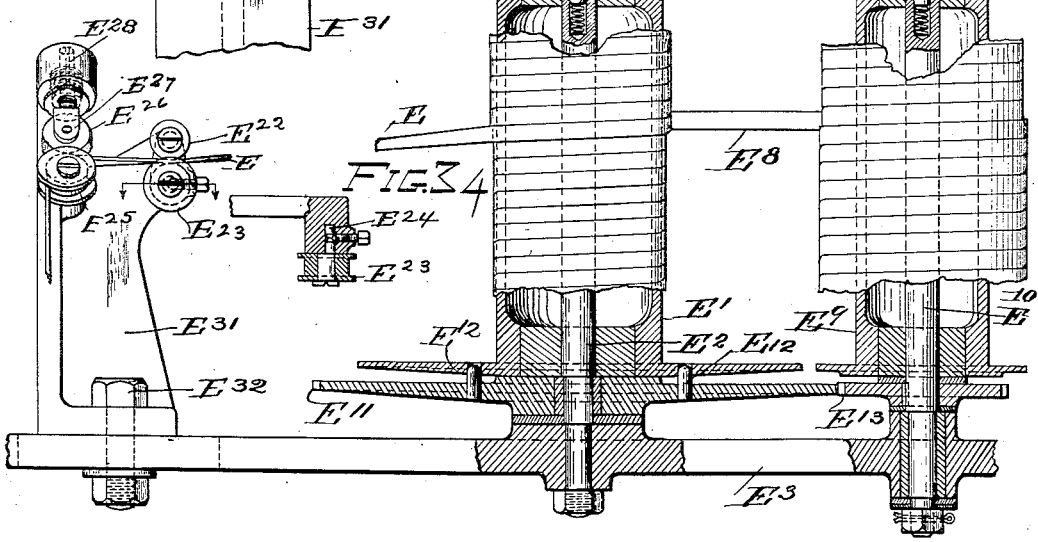

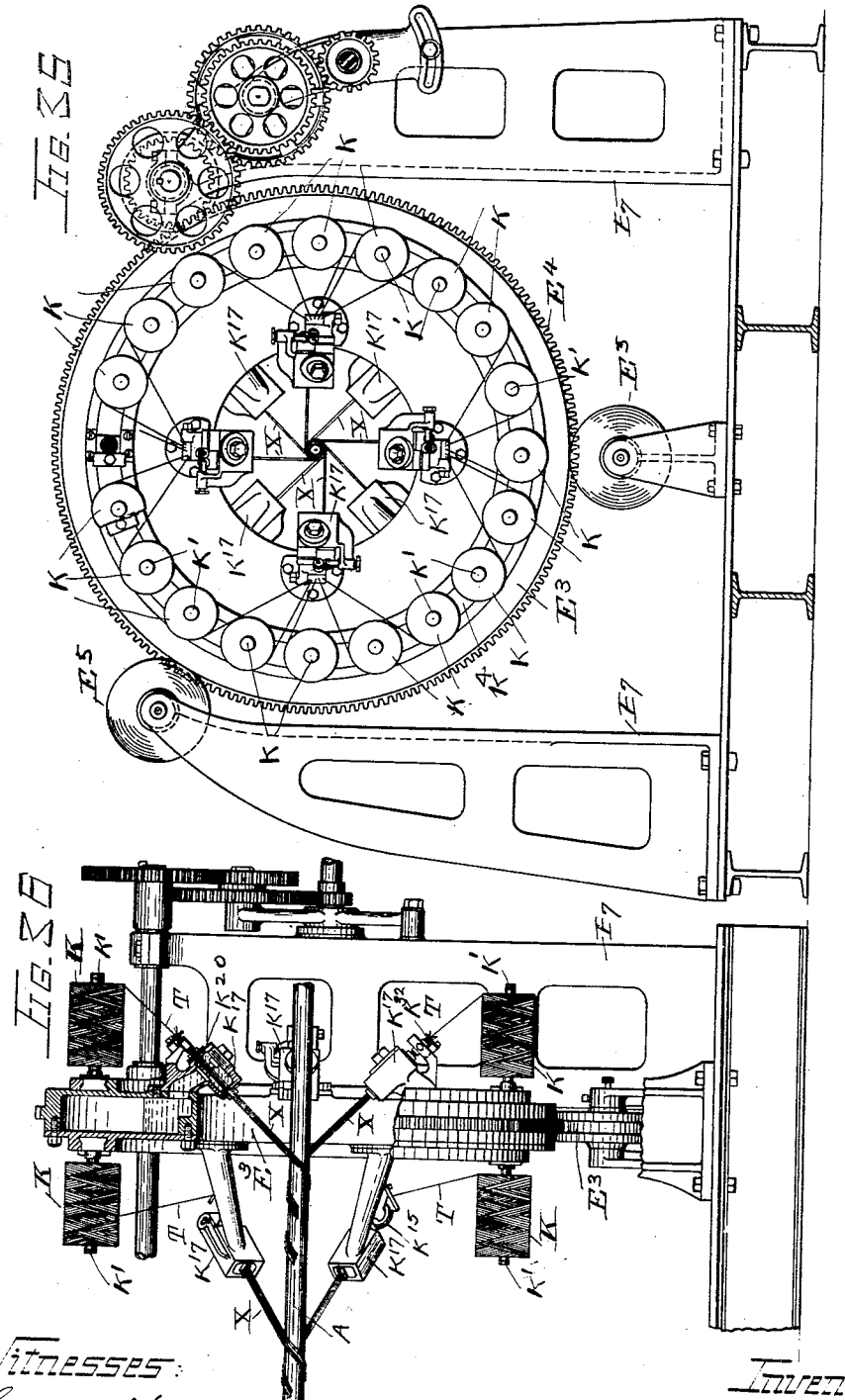

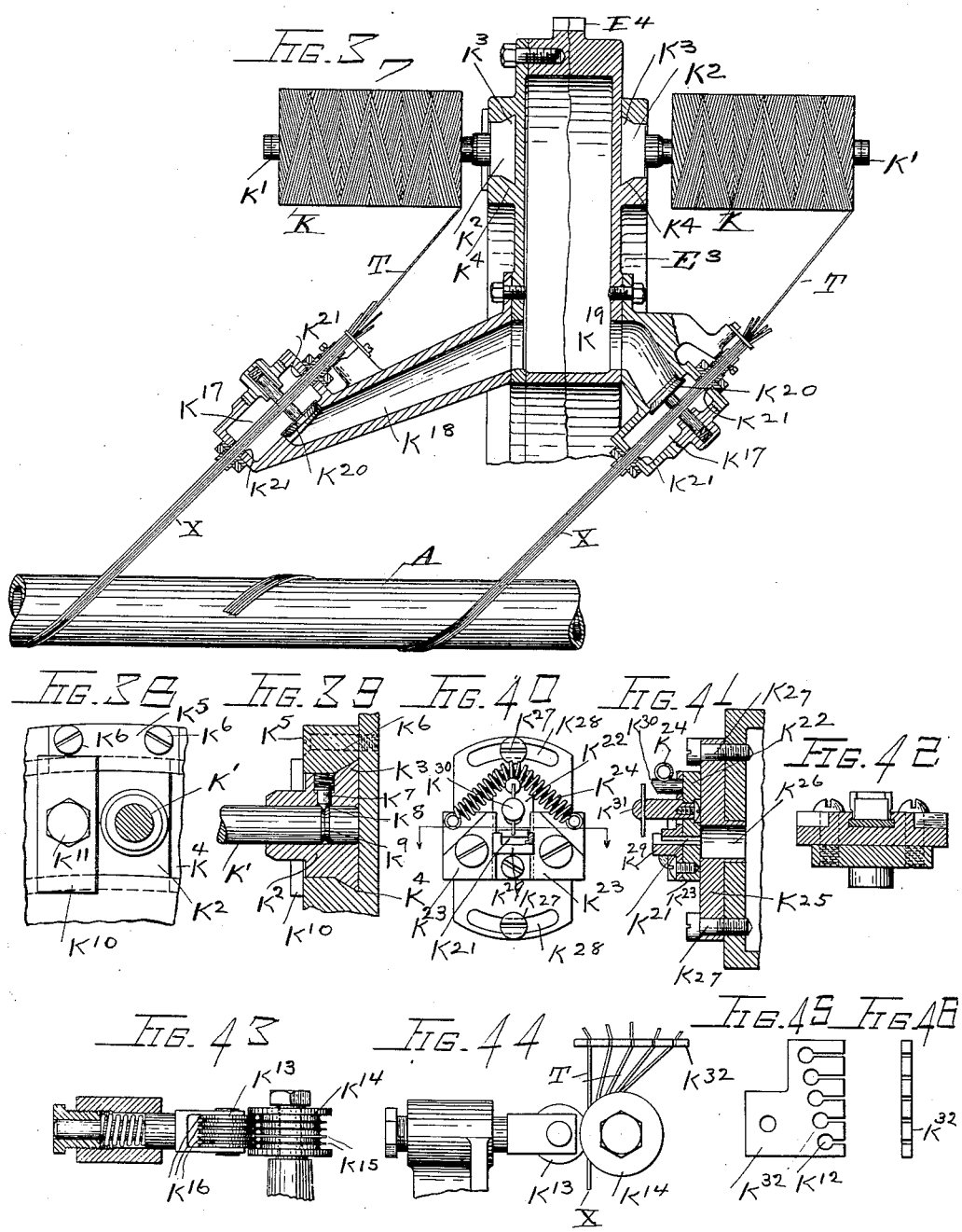

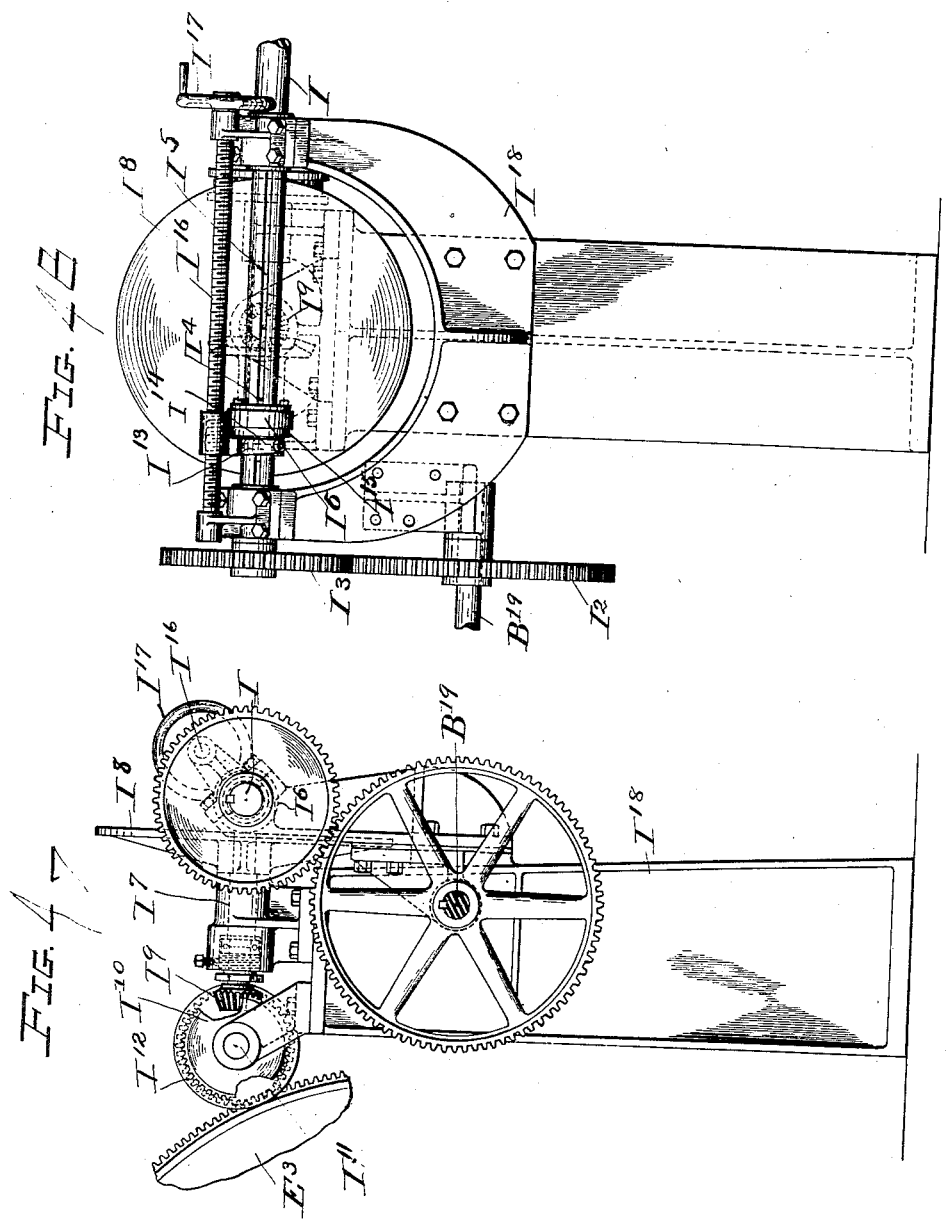

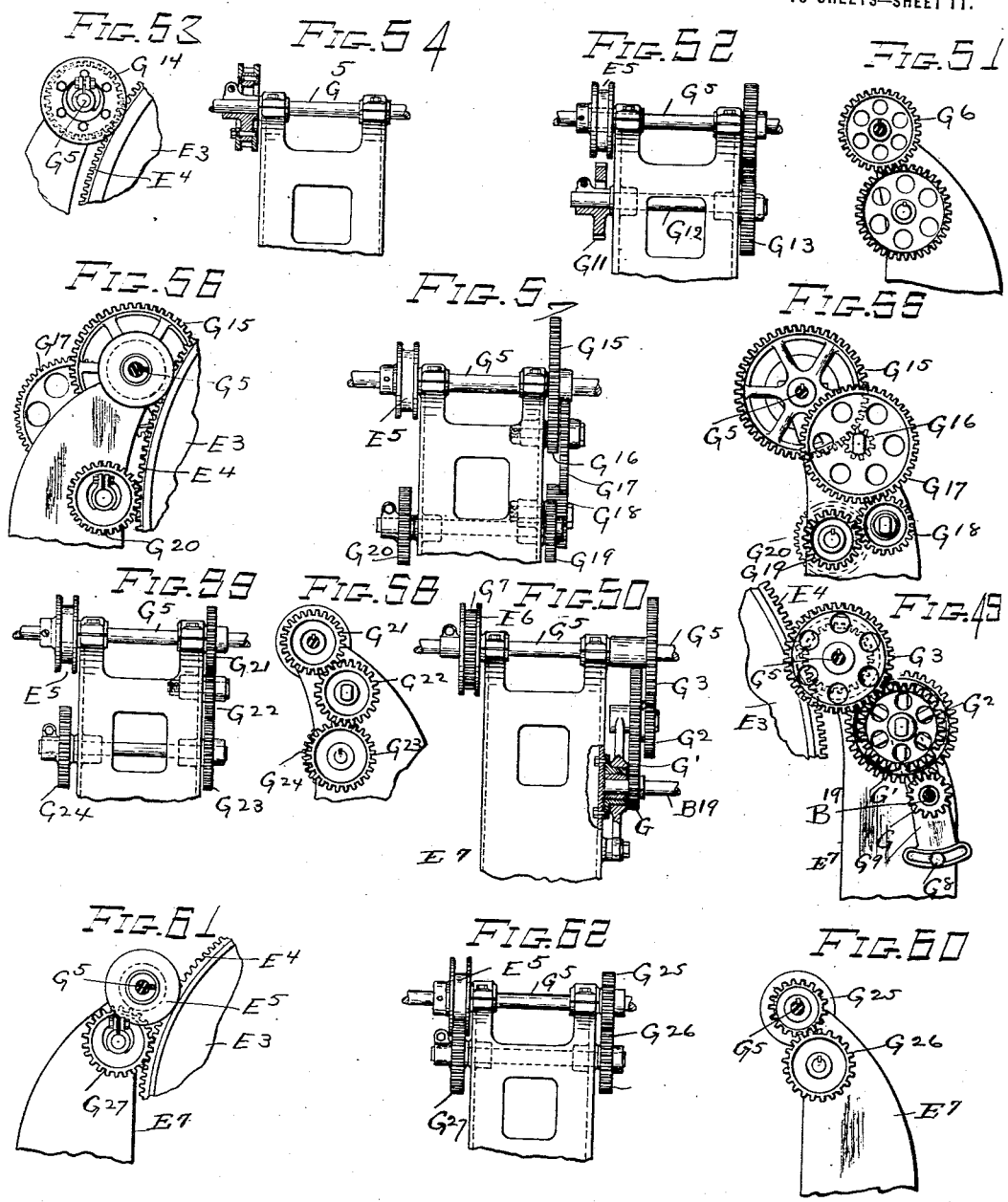

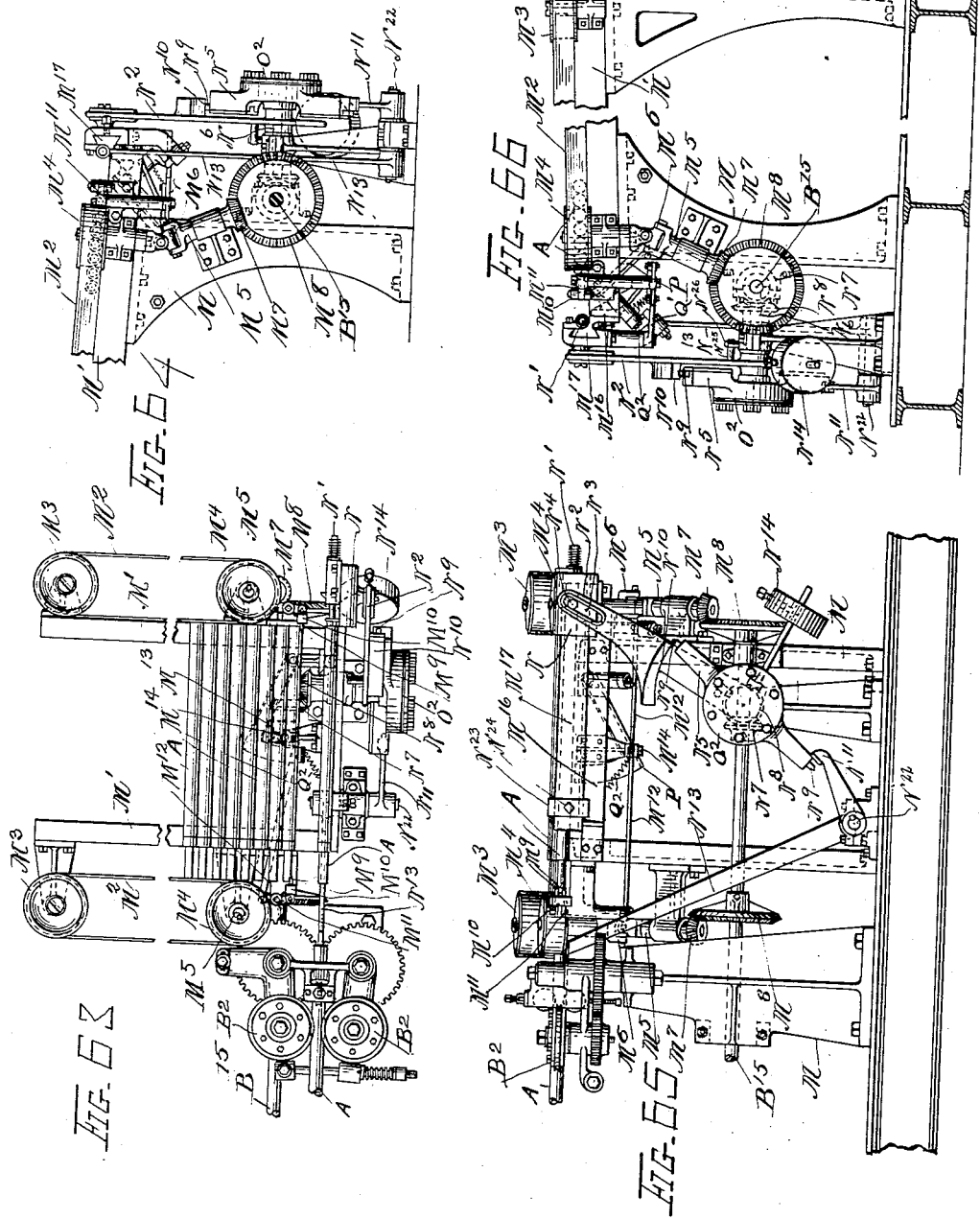

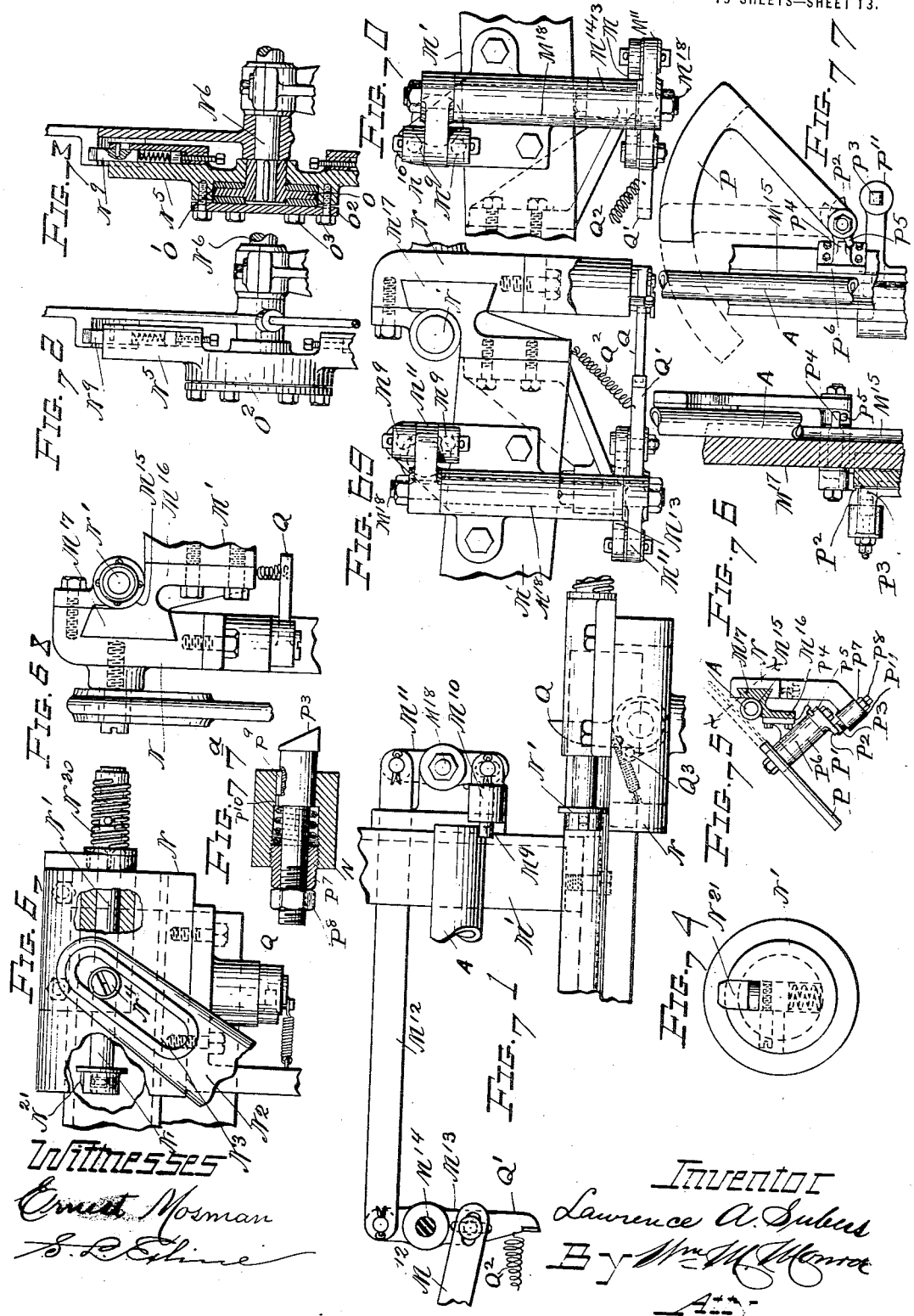

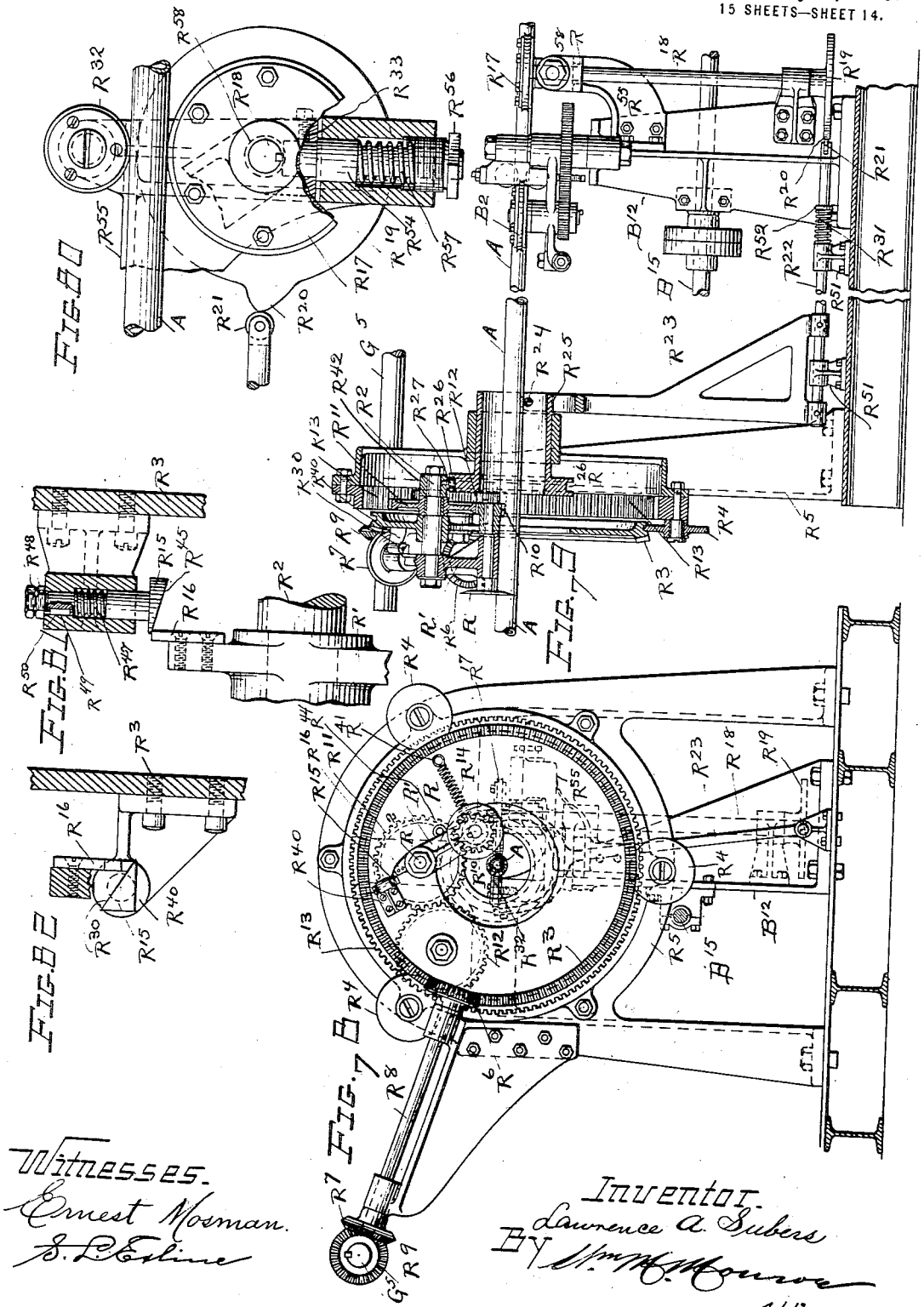

L. A. SUBERS.
AUTOMATIC MACHINE FOR MAKING TUBULAR FABRIC.
APPLICATION FILED NOV. 14, 1910. RENEWED MAR. 10, 1913.
1,145,446.
Patented July 6, 1915.
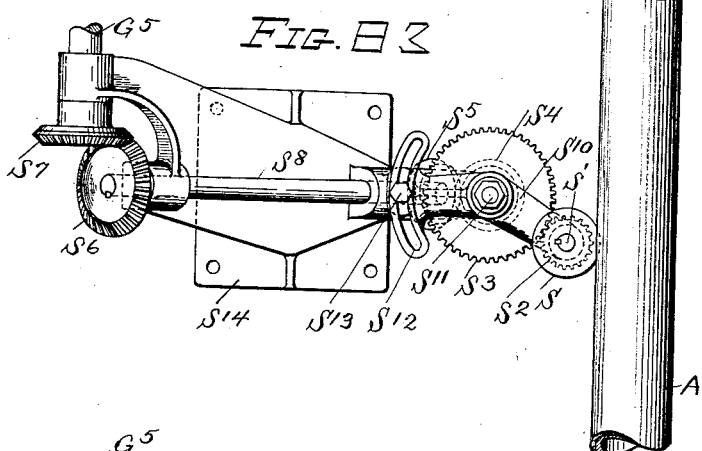
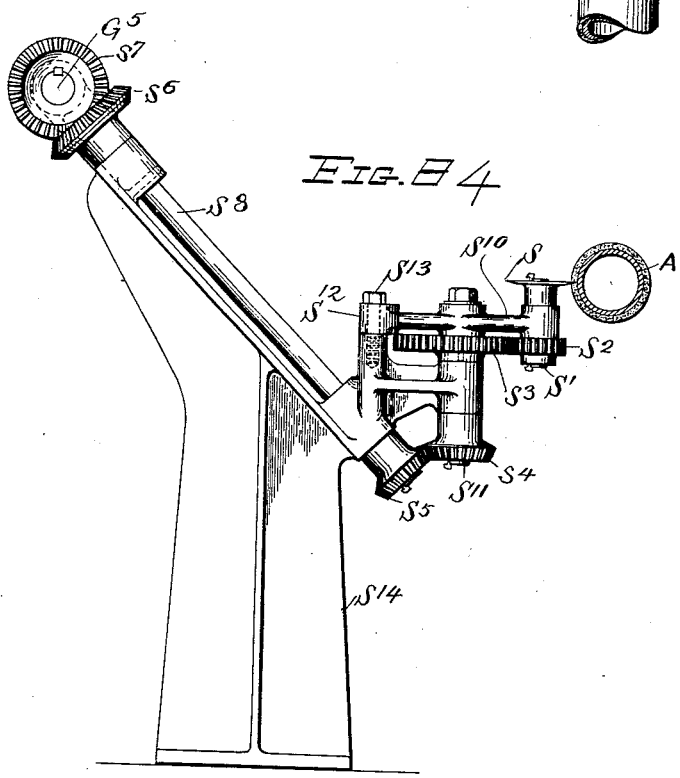

UNITED STATES PATENT OFFICE.

LAWRENCE A. SUBERS, OF CLEVELAND, OHIO.

AUTOMATIC MACHINE FOR MAKING TUBULAR FABRIC.

1,145,446.  Specification of Letters Patent.  Patented July 6, 1915.

Application filed November 14, 1910, Serial No. 592,313. Renewed March 10, 1913. Serial No. 753,423.

*To all whom it may concern:*

Be it known that I, LAWRENCE A. SUBERS, a citizen of the United States, and resident of Cleveland, in the county of Cuyahoga and State of Ohio, have invented certain new and useful Improvements in Automatic Machines for Making Tubular Fabric, of which I hereby declare the following to be a full, clear, and exact description, such as will enable others skilled in the art to which it appertains to make and use the same.

The objects of the invention are to provide an automatically operating machine for manufacturing a laminated fabric composed of parallel equally spaced cords or bands of cords, or bands of other fabric, cohering in a binding material of adhesive vulcanizable substance such as india rubber or such other adhesive material as may be predetermined, in which a series of such bands or cords are wound upon a mandrel and alternate with series of similar crossing bands, wound at an angle thereto, and in which all subsequently wound bands are so interlaid or wound as to cover the spaces between the formerly laid parallel regularly spaced series of parallel bands. The fabric thus constructed is not woven, interlaid, interlocked or braided in any manner and if it were not for the binding cohesive material or substance incorporated therewith would possess no cohesion, but all members would immediately fall apart. The device is also adapted to wind a layer or layers of circumferentially or transversely wound bands or cords in connection with the aforesaid angularly laid bands for making fire hose, analogous tubing, belting and tubular fabrics constructed of laminated-cohesive-interwound members of varying limits of elasticity, as illustrated in my former Letters Patent for interlaid or wound fabric, No 1,024,915, issued April 30, 1912, and divisions thereof, and is particularly and specifically described and claimed herein and illustrated in the accompanying drawings. In this device a longitudinally movable sectional mandrel or preferably a series of joined mandrels is employed by means of the use of which a hose pipe or tube of approximately any length can be manufactured. The machine by slight modifications in structure can be adapted to apply the binding of adhesive material vulcanizable or otherwise at the time of winding the bands or cords, or bands or cords frictioned or impregnated with the aforesaid material can be directly applied upon the mandrel or upon a coating of rubber or other material thereon, and thus greatly simplify the mechanism of the machine.

The invention comprises automatically acting mechanism for operating the machine and for propelling at a predetermined rate of speed the mandrel, which is preferably composed of a series of tubular sections of steel or other suitable material detachably joined together end to end.

It also provides a suitable device for continuously treating the entire periphery of the mandrels with any suitable substance to prevent undue adhesion of the inner lining thereto.

It also includes automatically acting devices for applying the rubber lining to the mandrel in advance of the cord or band winding devices, means for forming the rubber or other lining about the mandrel and for sealing the overlapping edges thereof.

The invention further comprises rotatable reels for the several series of cord or band applying and storing devices, means for coating the cords or bands prior to applying them upon the rubbered mandrel, when they are to be previously coated, means for removing the strips of protecting fabric therefrom when the bands or cords are previously coated, means for rotating the rotatable reels, for alternately applying series of bands or cords to the mandrel in opposite directions at predetermined intervals and at previously determined rates of speed, means for applying the circumferentially or transversely wound bands of regularly spaced cords, to the mandrel, or to previously wound layers of interwound bands, means for supporting the mandrel at predetermined points to prevent sagging or irregular movement thereof.

It also provides the mechanism for automatically supplying the mandrels to the machine, and for automatically inserting each one in succession in the open end of the mandrel last fed to the machine, and for alining them therein. This also includes suitable means for keeping the mandrels in parallel relation to each other and to the axis of the mandrel in the machine and in alinement with each other, mechanism for releasing one mandrel at a time and timing mechanism adapted to supply a fresh mandrel at exactly the right moment, so as to prevent any gap occurring between the mandrels. A further device is employed to rotate each mandrel in turn until the keyway therein registers with the key in the mandrel in front, so that all the mandrels will be perfectly alined with each other while the machine is operating.

It also comprises mechanism for cutting the fabric on the mandrel transversely in sections of predetermined length suitable for air brake hose or for other uses.

It still further provides a device for cutting the fabric preferably horizontally upon the mandrel and may be used conjointly with or independently of the transverse cutter as desired. And it further comprises the combination of the various parts and construction of the details as hereinafter described, shown in the accompanying drawings and specifically pointed out in the claims.

In the accompanying drawings Figure 1 is a plan view at a reduced scale of the machine; Fig. 2 is a side elevation thereof at a similar reduced scale; Fig. 3 is an enlarged longitudinal section of one mandrel showing in dotted lines a portion of a second mandrel joined thereto; Figs. 3ª and 3ᵇ are transverse sections of the mandrel and joining plug on lines $x$—$x$ and $y$—$y$ respectively; Fig. 4 is a similar view of the mandrel showing a finished piece of hose thereon ready for vulcanizing; Fig. 5 is a side elevation of a portion of the mandrel showing the arrangement of the driving mechanism and the mandrel propelling device; Fig. 6 is an end elevation thereof; Fig. 6ª is an end elevation of the bearing for the horizontal bevel gear shaft; Fig. 7 is a plan view of the belt shifting device; Fig. 8 is a transverse section of the main operating shaft, showing a hand operated screw for adjusting the friction pinion which drives the mandrel propelling mechanism; Fig. 9 is a plan view of the mandrel driving rollers; Fig. 10 is a transverse section of the mandrel showing the upper and lower supporting rollers; Fig. 11 is a side elevation thereof; Fig. 12 is a face view of one of the mandrel supporting stands which are spaced at predetermined intervals in the machine; Fig. 13 is a side elevation thereof and of the device for applying soapstone or other suitable material to the mandrel in advance of the device for applying the rubber lining thereon; Fig. 14 is an enlarged detail showing one of the upper roller mandrel supports employed in the first three support brackets, and its detail structure; Fig. 15 is a longitudinal section of the screw threaded bushing in which the forked pin is shown in which the mandrel supporting roller is mounted; Fig. 16 is an elevation of a spring pressed roller fork employed to give a yielding support underneath the mandrel. All the roller supports on these brackets are shown adjustable to allow for different sizes of mandrels and to allow for the increase in diameter of the hose as the several layers or laminations are wound thereon; Fig. 17 is an end view of the mandrel, and a supporting bracket showing the mechanism for applying the rubber lining of calendered rubber or other lining material to the mandrel, the removable rubber supply reel and the rollers which apply, stretch and seal the edges of the rubber over the mandrel, and also shows the reel upon which the projecting Holland cloth is wound; Fig. 18 is a side elevation thereof; Fig. 19 is a side elevation of the lower rubber applying roller; Fig. 20 is a section of one of the side rollers; Fig. 21 is an edge elevation of the spring pressed roller which seals the overlapping edges of the rubber lining; Fig. 22 is a longitudinal section of the socket for the stem of this roller; Fig. 23 is a transverse section of the support for the roller which presses against a pulling drum and by means of which the Holland cloth and rubber are drawn from their reel and while doing so rotate the reel; Fig. 24 is a detail section of the reel upon which the Holland cloth is wound; Fig. 25 is a plan view of the guide rollers for the rubber lining and its protecting Holland cloth; Fig. 26 is an end elevation of one of the rotatable reels upon which are supported the spools on which the rubbered bands are stored and arranged in position for applying spaced series of bands to the mandrel, also showing the means for rotating the same; Fig. 27 is a vertical central section of the same; Fig. 28 is an end elevation of the rotatable support for applying rubbered bands or cords in spaced circumferential spirals to the rubber covered mandrel or to the fabric material that may have already been wound thereon; Fig. 29 is a vertical central section thereof; Fig. 30 is a detail view in section of guide rollers for one of the bands; Fig. 31 is an enlarged face view of one of the spools on which the rubbered bands of cords or threads or other material and their covers of Holland cloth or non-adhesive material are wound and the guide rollers therefor; Fig. 32 is a transverse section thereof; Fig. 33 is a transverse section of an adjustable compression guide roller support; Fig. 34 is a similar section of a fixed guide roller support; Fig. 35 is a face view of one of the reels for the thread tubes containing prepared cords or threads and of the guides which combine them into bands and the devices which apply rubber or other adhesive material thereto before winding the spaced bands upon the mandrel; Fig. 36 is a vertical central section of the same; Fig. 37 is an enlarged section of a portion of the parts represented in Fig. 36; Fig. 38 is a plan view of one of the thread tube stems or spindles showing its means of attachment to the reel; Fig. 39 is a transverse section of the same; Fig. 40 is a plan view of one of the automatically closing gates for the rubber receptacles; Fig. 41 is a vertical section of the same; Fig. 42 is a transverse section of the same on line z—z Fig. 40; Fig. 43 is a plan view of roller guides for the cords composing one band; Fig. 44 is a side elevation thereof; Fig. 45 is a plan view of a perforated guide plate for the cords or threads; Fig. 46 is an edge view thereof; Fig. 47 is an end elevation of an individual, reversible, adjustable friction drive mechanism adapted for use with all the reels; Fig. 48 is a side elevation thereof; Fig. 49 is an end elevation of driving gears and support for the first reel; Fig. 50 is a side elevation of the same; Fig. 51 is an end elevation of the driving gearing and supports for the second and fourth reels; Fig. 52 is a side elevation of the same; Fig. 53 is an end elevation of the driving gear and support for the third reels; Fig. 54 is a side elevation thereof; Fig. 55 is an end elevation of the driving gears and support for driving the reels 5 and 9 which apply the circumferentially wound bands, cords or threads; Fig. 56 is a front elevation of the same; Fig. 57 is a side elevation of the same; Fig. 58 is an end elevation of driving gears and support for gears 6 and 8; Fig. 59 is a side elevation of the same; Fig. 60 is a rear end elevation of the driving gears and support for reels 7 and 10; Fig. 61 is a front end elevation of the same; Fig. 62 is a side elevation thereof; Fig. 63 is a plan view of the mandrel feeding device; Fig. 64 is an end elevation of the same showing the operating gearing; Fig. 65 is a side elevation thereof; Fig. 66 is an elevation of the end opposite to the end shown in Fig. 64; Fig. 67 is a side elevation enlarged showing the carriage and plunger which propels and inserts the mandrels in turn; Fig. 68 is an end elevation thereof; Fig. 69 is an end elevation of the carriage showing its support and the levers which operate holding pins for retaining the mandrels and alternately releasing them as they are needed in the machine; Fig. 70 is an end elevation of the opposite end thereof; Fig. 71 is a partial plan view of the end shown in Fig. 69, and also shows the carriage and cam lever which operates the retaining and releasing mechanism; Fig. 72 is a full end view of the friction driven lever which operates the carriage actuation lever; Fig. 73 is a vertical section of the same; Fig. 74 is an end view of the end of the plunger which is inserted in the hollow end of the mandrel; Fig. 75 is a side elevation of the curved blade which rotates the mandrel upon its holding plunger until positive engagement is made with the alining key; Fig. 76 is an enlarged section on lines x—x showing the relative positions of the blade which rotates the mandrel; Fig. 77 is a plan view of said blade and mandrel, taken at right angles to the axis; Fig. 77$^a$ is a longitudinal section through the bearing for the cam pin which operates the blade that rolls the mandrel; Fig. 78 is an end elevation of the device for operating the cutter, which revolves about the mandrel; Fig. 79 is a vertical longitudinal central section thereof; Fig. 80 is a plan view of the roll and cam which govern the moment at which the cutter operates, and the duration of such movement; Fig. 81 is a sectional view of the cam which throws the operation lever that carries the cutter into engagement with the fabric on the mandrel; Fig. 82 is an end view of the said cam; Fig. 83 is a plan view of mechanism arranged to cut the fabric on a longitudinal line; Fig. 84 is an end elevation thereof.

In Figs. 1 and 2 the general arrangement of the operating parts of the machine is shown in plan view and front elevation respectively. In these views and in Figs. 3, 3$^a$, 3$^b$, 4, 5, 6, 7, 8, 9, 10, 11, 12, 13, 14, 15, and 16 the mandrel and its supports and propelling means are clearly shown.

The object of the machine is to make fire hose, analogous tubing, belting and tubular fabrics constructed of laminated-cohesive-interwound members with varying limits of elasticity continuously upon a series of preferably steel mandrels or mandrel sections which are joined together end to end as greater length of mandrel is required, and are forced longitudinally through the machine at a predetermined rate of speed relative to the speed of the winding devices.

The mandrels A, A, are tubular and of the diameter of the internal diameter of the hose or tubular fabric it is desired to construct thereon, and are secured together by means of plugs A', A' each of which is provided with a key A$^2$ on each end adapted to fit two diametrically opposite key ways A$^3$ in each end of the mandrels, which are bored out to receive the plugs and are perfectly cylindrical and highly polished. Each plug is provided with an enlarged central cylindrical portion A$^4$ which is of the same diameter as the mandrel and separates two mandrels when they are attached together and its ends form shoulders A$^5$ against which the mandrels are closely abutted.

In Fig. 3 the position of the fabric on two united mandrels is shown, one mandrel being shown in dotted lines. After the rubber lining A$^6$ and fabric A$^7$ are formed upon the mandrels, a transverse cut is made through the fabric at one of the shoulders A$^5$ and the mandrels are then separated, The length of the hose thus formed upon each mandrel is then approximately the length required for that hose. The length illustrated is for a brake hose or analogous tubing up to $1\frac{3}{8}$ inches inside diameter and approximately 22 inches long.

In Fig. 4 one mandrel is shown after it has been detached from the accompanying mandrels, and the ends closed so that the fabric can be vulcanized. In this figure $A^8$, $A^8$ are closures for the inner opening spaced from each end and provided with screw threaded openings $A^9$ $A^9$. One end of each mandrel is closed before vulcanizing by means of a screw threaded rod $A^{10}$ screwed into one of the closures $A^8$, and passing through a flanged plug $A^{11}$. The flange $A^{12}$ of which covers that end of the mandrel and supports a washer or cap $A^{14}$ of rubber. A flanged ring $A^{13}$ is next employed to extend over the end of the fabric, and the unvulcanized rubber washer or cap $A^{14}$ is compressed thereby upon the end of the hose. The parts are finally clamped together by means of the washer $A^{15}$ and a nut $A^{16}$ screwed upon the outer end of the rod $A^{10}$. In the other end of the mandrel the plug which joins the mandrels together is retained and a rod $A^{17}$ longer than the rod $A^{10}$ is employed to secure the parts together, and passes through a central opening $A^{23}$ in the plug. A spacing ring or washer $A^{18}$ abuts against the outer shoulder $A^5$ on the plug, and is of the width of the rubber washer $A^{14}$ at its outer edge. A ring $A^{19}$ is sleeved over the outer end of the plug and is attached to the plug by means of a set screw $A^{20}$, a nut $A^{21}$ on the rod $A^{17}$ and washer $A^{22}$ finally secure the parts together for vulcanizing. The ring $A^{19}$ compresses the rubber washer upon the end of the hose so that the ends of hose are sealed at this end with rubber. The similar ring $A^{13}$ at the other end has the same function. To permit the stripping of the hose from the mandrel by means of air gaseous or fluid pressure applied between the hose and mandrel each plug $A'$ is externally grooved at $A^{24}$ for the passage of compressed air, an annular external groove $A^{25}$ permits the air to circulate around the plug, and it passes around the end of the mandrel where the clamping ring R prevents it from escaping at that point. The air is introduced through the central opening $A^{23}$ after the rod is removed, and screw threads $A^{26}$ permit the attachment of an air pump nozzle thereto. The clamp R prevents the plug from being driven out.

In Figs. 1, 2, 5, 6, 7, 8, 9, 10, 11, 12, 13, 14, 15 and 16 the means for supporting and propelling the mandrel are shown. The mandrels forming a continuous cylinder are supported and guided by means of rotating adjustable rolls C, C, C, forming a three point roller support and mounted upon brackets or stands $C'$, $C'$, $C'$, conveniently spaced in the machine. The mandrels are propelled by means of horizontal propelling rolls $B^2$, $B^2$, keyed to vertical shafts $B^3$, $B^3$. These shafts are rotatably mounted upon pivotal arms $B^4$, $B^5$, and are actuated by spur gears $B^6$ $B^6$ engaging with spur gears $B^7$ $B^8$, one of which $B^7$ is rotatably mounted upon a vertical stud $B^{10}$ and intermeshes with the gear $B^8$ which is keyed to a vertical shaft $B^9$ mounted in bearings $B^{11}$ in a bracket or stand $B^{12}$ and shaft $B^9$ carries at its lower end a miter gear $B^{13}$ engaging a miter gear $B^{14}$ on the horizontal shaft $B^{15}$ rotatably mounted on the stand $B^{12}$ and adjacent stands $B^{50}$. The pivotal arms $B^4$ and $B^5$ which support the rollers $B^2$, $B^2$ are mounted on the vertical stud $B^{10}$ and vertical shaft $B^9$ respectively, and pressure is maintained to keep the rollers $B^2$ $B^2$ in engagement with the mandrels by means of the rod $B^{16}$ pivoted at $B^{17}$ in one of the arms, and engaging the other arm by means of the spring $B^{17}$ the pressure of which is made adjustable by means of the nuts $B^{18}$ upon the screw threaded outer extremity of the arm. The arm $B^5$ can be rigidly secured in any desired portion by means of the bolt $B^{43}$ and slot $B^{44}$. The mandrels are thus propelled by means of the rolls $B^2$, $B^2$ which move in opposite directions through the agency of the gearing described, and the actuating shaft $B^{15}$ receives its power through a train of gears operatively connecting it with the driving shaft $B^{19}$ which are shown to be as follows. A bevel gear $B^{20}$ mounted on the shaft $B^{15}$ and driven by a bevel pinion $B^{21}$ and a train of spur gears $B^{22}$ $B^{23}$ $B^{24}$ rotatably mounted upon a bracket or stand $B^{25}$ and a pinion $B^{26}$ upon the extremity of the friction shaft $B^{27}$ upon which is secured a vertical friction disk $B^{28}$. A friction roll $B^{29}$ adjustably mounted upon the driving shaft $B^{19}$ drives the friction disk $B^{28}$. The friction roll $B^{29}$ is slidingly mounted on its shaft and is adjusted in position by means of a fork $B^{30}$ which is provided with pins $B^{31}$ $B^{31}$ carrying rolls $B^{32}$ $B^{32}$ which engage in an annular slot $B^{33}$ in the sleeve $B^{34}$ upon which the friction roll $B^{29}$ is mounted. This fork is mounted upon a screw shaft $B^{35}$ which in turn is rotatably mounted in bearings $B^{36}$ in arms upon the caps $B^{37}$ of the bearings for the driving shaft. This screw shaft is rotated by means of a hand wheel or crank $B^{38}$ to place the friction roll in any desired position. Driving pulleys $B^{39}$ and idler $B^{40}$ are shown on the driving shaft and a belt shifter $B^{41}$ is shown in Figs. 5 and 7.

In Figs. 10 and 11 are shown upper and lower adjustable pressure rollers $B^{42}$ adapted to engage the mandrel at diametrically opposite points and to prevent the mandrel from rotating on its axis. Placed wherever convenient through the machine are the supporting stands C' C' for the mandrel, upon which the guiding and supporting rolls C, C are positioned. Any desired pressure sufficient to keep the mandrel from turning on its longitudinal axis can be obtained by means of screws $B^{45}$. The rolls C, C, are preferably three in number and are regularly spaced about the mandrel. The rolls C, C, in the first three standards or frames are adapted to grip the mandrel under heavy pressure so as to assist the vertical rolls $B^{42}$ in preventing the mandrel from turning as it is propelled through the machine; for this reason they with the rolls $B^{42}$ are preferably formed of wood fiber $C^2$ or some material which will not abrade the mandrel when under pressure. They are also a little more concave on their edges than the others so as to obtain a better grip as shown in Fig. 14. The rollers upon the other standards can be made of aluminum or other material not adhesive to rubber. The lower roller is centrally mounted underneath the mandrel and is spring pressed and adjustable. The other rollers are adjustable only. The manner of mounting the lower roller is shown in Fig. 16 where $C^3$ is a screw threaded bushing which is clamped in the split boss $C^4$ of the standard C'. The roller C is mounted in a fork $C^5$ the stem of which is inserted in the bushing and is pressed by the spring $C^6$. The fork and roller can turn automatically to adjust the roller to the mandrel. The other two rollers are mounted in forks $C^7$, $C^7$ which are inserted in bushings $C^8$, $C^8$ clamped in split bosses $C^9$ $C^9$ and the stems $C^{10}$ of the forks $C^7$ are prevented from turning by means of conical shaped pins $C^{11}$ screw threaded at $C^{12}$ inserted in the split extremities $C^{13}$ of the stems. The roller forks for the rollers in all the standards except the first three are similarly mounted to the one shown in Fig. 15 and the rolls are preferably formed of aluminum.

Figs 1, 12 and 13 D is a reservoir for powdered soap stone or other suitable substance through which the mandrels pass and by means of which they are treated to prevent the rubber from sticking thereto. D', D' are stuffing boxes one of which is shown in section. In each of the glands a packing material $D^3$ is employed. The packing at the inlet end is more compact than at the outlet end, since at the inlet end the packing should serve to clean and brighten the mandrel and at the outlet end merely serves to retain the powdered soap stone or other substance and to distribute it evenly over the surface of the mandrel.

In Figs. 17 to 25 inclusive is shown the mechanism for applying the rubber or other lining to the mandrel prior to applying the fabric bands thereto. In these views H is the rubber band formed of calendered unvulcanized rubber. This band is wound together with its protecting band H' of Holland cloth or other non-adhesive material upon a reel $H^2$. The rubber band passes under an idler pulley $H^3$ and thence over a flanged guiding pulley $H^4$ to the mandrel. The Holland cloth after passing over the pulley $H^4$ separates from the rubber band and is pulled between the rolls $H^5$ and $H^6$ and is wound upon a spool $H^7$. This is accomplished by means of gears $H^8$ and $H^9$ on the respective shafts $H^{10}$ and $H^{11}$. The shaft $H^{10}$ is driven by bevel gears $H^{12}$ and $H^{13}$ and the bevel gear shaft $B^{15}$. The rubber band is pressed against the lower surface of the mandrel by means of a roller $H^{19}$ and is turned up at its edges by means of a grooved roller $H^{14}$ which also presses it against the lower surface of the mandrel. The axis of the spool $H^7$ is provided with a radially movable spring pressed key $H^{24}$ made adjustable by a screw $H^{25}$ to exert adjustable pressure on the body of the reel. This provides a friction drive which allows the spool to slip as the diameter of the roll of Holland cloth increases thereon. The shafts $H^{16}$ and $H^{17}$ of these rollers are eccentrically mounted in their bearings so that the necessary amount of pressure can be provided for. As the mandrel is propelled these rollers will rotate. A pair of vertical grooved rollers $H^{18}$, $H^{18}$ further form the rubber around the mandrel, and next a spring pressed roller $H^{19}$ presses the rubber against the lower surface of the mandrel and tends to stretch it upward tightly around the mandrel, and the inclosure of the mandrel by the rubber is completed by means of a series of angularly disposed rollers $H^{20}$ which have adjustable stems $H^{21}$, and are provided with curved engaging edges, which stretch and form the rubber around the mandrel. The edges of the rubber lining have beveled edges which overlap as shown in Figs. 21 and 22, and a vertical spring pressed roller $H^{22}$ seals the edges together. A standard $H^{23}$ supports the described rollers. The edges of the rubber lining are beveled for the purpose of obtaining a perfect adhesion and uniform thickness of the lining around the mandrel.

In Figs. 1 and 2 are illustrated the general features of construction, arrangement and mode of operation of the machine, showing the relative positions of the members in the machine to each other, and their manner of coöperation to produce the required tubular fabric. In these figures the connected mandrel A mounted in the brackets and rollers heretofore described is propelled longitudinally and centrally through a series of rotatable storage reels, one reel being provided for each separate series of bands or cords, and each reel is provided with means for giving to it a predetermined rate of speed of rotation relative to the speed of propulsion of the mandrel, and relative to its local position in the machine, and gradually increasing diameter of the fabric. In these views these reels are numbered 1, 2, 3, 4, 5, 6, 7, 8, 9, and 10. The reels by means of which the bands or threads are wound upon the mandrel at an angle of approximately 135° to a longitudinal surface line in spaced parallel rows, are designated by the numerals 1 and 3, 6 and 8, respectively, and reels 2, 4, 7 and 10 lay the bands or threads in parallel spaced rows at approximately right angles to the parallel rows of the bands or cords laid by reels 1, 3, 6 and 8. The reels 5 and 9 are constructed and operated to lay series of spiral spaced bands or cords or threads in the desired positions in the fabric. The reels 1, 3, 6 and 8 rotate in the opposite direction to the reels 2, 4, 7 and 10, and the reels 5 and 9 preferably rotate in the same direction. The reels for applying the bands at approximately 45° and 135° to the mandrel are similarly constructed and are more clearly illustrated in Figs. 26, 27 and 35 and 36.

In Figs. 26 and 27 the reel shown is adapted for use with bands of preferably rubbered cords or threads and in Figs. 35 and 36 the reel shown is adapted for use with a device for coating the bands or threads as they are being wound upon the mandrel. In the preferable form shown in Figs. 26 and 27 the bands E, E, of cords or threads or other material are stored upon spools $E'$, $E'$ which rotate upon spindles $E^2$ secured to the body $E^3$ of the reel. Each reel is provided with a spur toothed circumferential edge $E^4$ by means of which it is rotated upon its supporting rolls, which are preferably three in number $E^5$, $E^5$ and in some instances, depending upon the arrangement of the actuating gears one supporting roll $E^6$ is provided with spur gear teeth and becomes a driving pinion as well as a supporting roll. The rollers are mounted upon suitable brackets or supports $E^7$ $E^7$. The coated bands are protected from adhesion when wound on the spools by means of a protecting strip $E^8$ of Holland cloth or other non-adhesive material, and it is necessary that this cover should be removed as the bands are being unwound therefrom and applied to the mandrel. The mechanism for accomplishing this result is illustrated in Figs. 31, 32, 33, and 34, and also the guiding forming and tension devices for the bands as they are wound upon the mandrel. In these views the band E is shown wound upon a spool $E'$ which is rotatably mounted upon the spindle $E^2$ secured upon the reel body $E^3$. The strip $E^8$ of Holland cloth coats the band to prevent adhesion of its coils, and this strip $E^8$ is wound upon an adjacent parallel spool $E^9$ rotatably mounted upon the spindle $E^{10}$ which is in turn rotatably mounted in the body of the reel $E^3$. These spools are operatively connected so that the movement of the band while being wound upon the mandrel will rotate both of them. This is accomplished by means of the following mechanism: The spur gear $E^{11}$ mounted upon the spindle $E^2$ is connected with the spool $E'$ by means of pins $E^{12}$, $E^{12}$, thus permitting the removal of the spool and substitution of a fresh one therefor. This gear engages with a spur gear $E^{13}$ upon the spindle $E^{10}$ and rotates the spindle $E^{10}$ which in turn rotates the spool $E^9$ by means of a friction lever $E^{14}$ pivoted on the spindle $E^{10}$ and a spring pressed plunger $E^{15}$. The outer end of the lever $E^{14}$ is provided with a friction point $E^{16}$ made preferably of arguto wood fiber which presses upon the face $E^{17}$ of the spool. The plunger engages the eccentric point $E^{18}$ of the lever and exerts a constant pressure thereon. The friction contact provides a connection which will slip when the diameter of the roll of Holland cloth increases on the spool $E^9$. The construction of the pivoted lever $E^{14}$ is such that when it is desired to replace the spool $E^9$ the lever can be drawn down in line with the spindle, and will remain in this position owing to the flat lever $E^{19}$ of the lever engaging the outer end of the plunger. The spool $E'$ is retained by means of a similar pivoted lever $E^{20}$ and spring pressed plunger $E^{21}$.

In Figs. 31 and 32 are shown a pair of guide rolls $E^{22}$ and $E^{23}$ for the band E and in Fig. 34 the shaft for the female roll $E^{23}$ is shown adjustable relatively to the male roll by means of an eccentric portion $E^{24}$.

In Fig. 33 the guide and tension rolls $E^{25}$ and $E^{26}$ are shown. In this figure a section of the stem for the male roll $E^{26}$ is shown. Here the roll is shown mounted in a fork $E^{27}$ provided with a keyed stem $E^{28}$ and with a screw threaded bushing $E^{29}$ which engages the tension spring $E^{30}$. The bracket $E^{31}$ upon which the guides are mounted is adjustably mounted upon the body of the reel by means of bolts $E^{32}$ movable in slots $E^{33}$ therein.

In Figs. 26 and 27 four spools for the bands are shown on each side of the reel body, and the tension guides are so positioned as to wind the bands of cords or threads or other material at regularly spaced intervals upon the mandrel as shown in Fig. 27 at the angle shown.

In Figs. 28, 29 and 30 the bands of cords or threads or other material F are wound upon similar spools $F'$ shown as four in number, and two on each side of the reel body $E^3$. The arrangement of the Holland strips $F^2$ spools $F^3$ therefor and tension rolls $F^4$ are nearly the same as for the devices just described. The difference being that guide rolls similar to $E^{22}$ and $E^{23}$ Fig. 26 are dispensed with for the reason that the angle at which the bands are applied is different and the guide rolls are not necessary.

Fig. 30 is a detail section of the tension rolls $F^4$ and $F^5$. Other portions of the device are practically the same as shown in Figs. 26 and 27, and hence are designated by corresponding numerals.

In Figs. 49 to 62 inclusive are illustrated the various gear trains by means of which the several reels are rotated at selected rates of speed and in opposite directions to correspond to the local rate of speed and angle required in laying the bands of cords or threads or other material upon the rubbered mandrel, and upon the fabric as it gradually increases in diameter, and also relatively to the ratio of speed of propulsion of the mandrel.

In Figs. 26, 49 and 50 the driving gears for the reel No. 1 are shown and their connection with the driving shaft $B^{19}$ and shows means for changing the speed when required. Here G is a pinion on shaft $B^{19}$. $G'$ is a spur gear meshing therewith. $G^2$ and $G^3$ are a train of gears operating a reel drive shaft $G^5$ which operates all the reels. A roller $E^6$ on this shaft is provided between its flanges with spur teeth $G^7$ which engage the teeth $E^4$ on the periphery of the reel body. The speed of this reel can be changed by changing the gear $G^2$ which is mounted on a swinging arm $G^9$ adjustable at $G^8$.

In Figs. 51 and 52 are shown the gears for driving reels 2 and 4 in the opposite direction to reel 1, and at a slightly reduced speed since they are laying bands of cords or threads on top of bands of cords or threads wound by reel 1. Here gear $G^6$ is mounted on the reel drive shaft $G^5$ and the reel is driven by gear $G^{11}$ operated by shaft $G^{12}$ and gear $G^{13}$. Reel 3 is operated by one gear $G^{14}$ shown in Figs. 53 and 54, mounted on shaft $G^5$, in the same direction and speed as reel 1, since it winds the bands on the mandrel in the spaces between the bands laid by reel 1. Reels 5 and 9 lay the circumferential or spiral bands and the operating gearing therefor is shown in Figs. 55, 56 and 57. Here a train of gears $G^{15}$, $G^{16}$, $G^{17}$, $G^{18}$, $G^{19}$, and $G^{20}$ drive the reels at a very much higher rate of speed than the rate of speed of the other reels, since the angle is so slight. Reels 6 and 8 are driven by gears $G^{21}$, $G^{22}$, $G^{23}$, and $G^{24}$, as shown in Figs. 58 and 59 and in the same direction as reels 1 and 3 but at a reduced rate of speed because the diameter of fabric is increased while the rate of propulsion of the mandrel remains the same.

Figs. 60, 61, 62 show the gears $G^{25}$, $G^{26}$ and $G^{27}$ for reels 7 and 10 which are driven in the opposite direction to reels 1 and 3 and at a slower rate of speed. The rate of speed of each pair of reels for applying the parallel series of bands constantly decreases as the diameter of the hose or tubular fabric increases, which is necessary to keep the angle the same. The tension upon the last laid bands on reels 4 and 10 should preferably be greater than upon the others to compress the fabric so as to fill completely the spaces therein. The spaces left between the bands wound by reels 1, 2, 3 are closed by bands wound under tension by reel 4 and the spaces left between the bands wound by reels 6, 7, 8 are closed by bands wound by reel 10. Reels 5 and 9 are both used only when it is desired to separate the circumferential layer into two series, one series being wound in a layer outside of the other layer. The outer series is then laid to cover the spaces left between the parallel spaced bands of the inner series.

In Figs. 47 and 48 is shown an adjustable reel drive which can be employed to drive each reel independently, at a predetermined rate of speed and in either direction, and by means of which fine adjustment of speed can be attained without multiplication of the gearing, and at much less expense than would be occasioned by the construction of a separate set of gears to drive each reel. In these figures I is a shaft which passes behind each reel and furnishes power for all of them. $B^{19}$ is the operating shaft therefor. $I^2$ is a spur gear on shaft $B^{19}$ engaging spur gear $I^3$ on shaft I, which drives a slidable friction roll $I^6$ thereon, which is provided with a spline $I^4$ operating in a groove $I^5$. A friction shaft $I^7$ at right angles to the shaft I carries on its one extremity a friction disk $I^8$ adapted to be engaged by the friction roll $I^6$ and upon the other extremity of the shaft $I^7$ is mounted a bevel pinion $I^9$ which drives a bevel gear $I^{10}$ upon the shaft $I^{11}$ of the geared roller $I^{12}$ which drives the geared edge of the reel body $E^3$. The friction pinion can be adjusted to engage any point on the friction disk $I^8$ by means of a clutch fork $I^{13}$ engaging an annular groove $I^{14}$ on a sleeve $I^{15}$ attached to the friction roll, and the fork is mounted upon a screw $I^{16}$ parallel to the shaft I and is rotated by means of a crank or hand wheel $I^{17}$, a suitable supporting frame $I^{18}$ is provided for the various parts.

In Figs. 35 to 46 inclusive are shown the means provided for coating bands of cords or threads prior to winding them upon the mandrel. In these views K, K, represent tubes of treated and prepared cords or threads T which are attached to the reel $E^3$ in an annular ring on each side thereof, five tubes of cords being shown to form each band, but more or less cords may be used to a band if required, by using a larger or smaller number of tubes of cords or threads. Each tube is rotatably mounted upon a spindle $K'$, and each spindle is mounted for convenience upon a block $K^2$, having a dove tailed base $K^3$. These bases are slidably mounted in a dove tailed groove $K^4$ annularly sunk into the face of the reel in which they can be adjusted to the desired position. A portion of the outer wall at $K^5$ of the annular groove is removable for the insertion of the bases, and screws $K^6$ can be employed to secure the ring in place. Each spindle is secured in its base by means of a spring actuated pin $K^7$ having a conical point $K^8$ which enters a groove $K^9$ in the spindle. A plate $K^{10}$ is clamped over the base by means of a screw $K^{11}$ which enters the base. This is illustrated in Figs. 38 and 39. Guiding openings $K^{12}$ in a plate $K^{32}$ collect the several cords which form each bank K and direct them to grooved guide rollers $K^{13}$ and $K^{14}$ between the grooves of which the cords are retained in close relative position before they enter the rubber coating chamber. The peculiar character of these rollers is shown in Figs. 43 where the thin flanges $K^{15}$ on one roller enter corresponding grooves $K^{16}$ on the other roller. Each rubber coating chamber $K^{17}$ is mounted upon an inclined hollow feed neck or tube $K^{18}$ which communicates with an annular chamber $K^{19}$ in the interior of the reel body. The rubber or other adhesive material is contained within the reel body and when the feed tubes $K^{18}$ arrive at the lower side of the reel body the fluid will run down them into the coating chamber $K^{17}$, $K^{17}$, as in Fig. 36 and when the tubes are in their highest position the fluid material is prevented from running out by means of lightly spring pressed valves $K^{20}$. The amount of the fluid adhesive material in the reels should never be allowed to become less than what will half fill the reel body, and the weight of this will always open the valves $K^{20}$ when they are in their lowest position. The cords pass through an opening $K^{21}$ in the inlet end of the rubber chamber and passes out of a similar opening at the outlet end to the mandrel, as shown in the Figs. 36 and 37. One wall $K^{22}$ of this opening is slidable in gibs $K^{23}$ and is spring pressed at $K^{24}$ to keep the opening as far as the thickness of the cords will permit. The exact construction is seen in Figs. 40, 41, and 42. Here $K^{25}$ is a plate having an opening $K^{26}$ for the passage of the cords. This plate is adjustable by means of screws $K^{27}$ and slots $K^{28}$. One wall $K^{29}$ of the opening $K^{21}$ is stationary and the other $K^{22}$ is movable in gibs $K^{23}$. The spring $K^{24}$ is secured at each end to one of the gibs and passes over a post $K^{30}$ on the movable wall. The movable wall or gate $K^{22}$ can be held away from the cord when desired in threading it by means of an eccentric pin $K^{31}$ which is secured behind it in a stationary part.

In Figs. 44, 45, and 46 is shown the character of the guide plate for the separate cords.

In Figs. 63 to 77 inclusive M is a frame upon which are secured bars $M'$ which support a series of mandrels A ready for application to the machine. These bars are slightly inclined to permit the mandrels to roll by gravity into alinement with their position in the machine. The mandrels are maintained in parallel relation to each other and to the mandrel axis in the machine by means of the parallel belts $M^2$ $M^2$ which just touch the ends of the mandrels, thereby keeping the ends of the latter in alinement, and are mounted upon pulleys $M^3$, $M^3$ and $M^4$, $M^4$. The pulleys $M^4$, $M^4$ are operated by means of the shaft $M^5$ having universal joint $M^6$ therein, and by bevel gears $M^7$, $M^8$ and shaft $B^{15}$ before mentioned, the movement of the belts being in the direction the mandrels roll. The mandrels are restrained from rolling off from their support by means of the pins $M^9$, $M^9$ at each end thereof, which slide in bearings $M^{10}$, $M^{10}$ and are actuated by rock arms $M^{11}$, $M^{11}$ secured to shaft $M^{18}$, and which are simultaneously operated in opposite directions by means of links $M^{12}$, $M^{12}$, connected with the rock arm $M^{13}$ mounted upon a vertical pivot shaft $M^{14}$. This mechanism is actuated in a manner hereinafter described. When released each mandrel A is received upon a concave surface $M^{15}$ of a dovetailed projection $M^{17}$ of the transverse bar $M^{16}$. Upon this dovetailed projection $M^{17}$ a carriage N is adapted to reciprocate. A spring pressed plunger $N'$ in alinement with the axis of the mandrel in the machine registers with the mandrel engaging the concave surface $M^{15}$ and when the carriage N moves forward will insert the projecting end of the mandrel to be fed into the hollow end of the mandrel in the machine in front of it. The carriage is operated by means of the lever $N^2$ slotted at $N^3$ and engaging a pin $N^4$ on the carriage and mounted on a transverse shaft $N^6$. This lever is given its forward movement by means of the double friction driven lever $N^5$ mounted upon said shaft $N^6$ which is driven by means of the miter gears $N^7$ and $N^8$ operatively connected with the said shaft $B^{15}$. The lever $N^5$ is double and is provided with a depressible and adjustable point $N^9$, at each end. One point is adapted to engage the cam shaped portion $N^{10}$ of the lever $N^2$ while the other end of this lever is adapted to engage the short lever $N^{11}$ fastened to the shaft $N^{22}$. The long lever $N^{13}$ fastened to this shaft $N^{22}$ is designed to rest against the lower face of the mandrel A in the machine and thus prevent movement of the friction driven lever $N^5$. These levers $N^{11}$ and $N^{13}$ constitute a bell crank. The lever $N^2$ is normally thrown backward to withdraw the carriage so as to be ready to receive a mandrel by means of the adjustable weight $N^{14}$ and is moved forward by the rotation of the double lever $N^5$ when it is released from the short lever $N^{11}$. This release will occur at the moment the mandrel in the machine passes the extremity of the rock arm $M^{13}$, and as soon as released the double lever will rotate and the depressible point $N^9$ will engage the cam $N^{10}$ and will move the operating lever $N^2$ and carriage $N$ forward and the plunger $N'$ will force a fresh mandrel into engagement with the mandrel in the machine.

The double lever and its friction driving mechanism are shown in Figs. 72 and 73 where $O$ is a disk provided with friction washers of some suitable material such as leather. This disk is mounted upon the transverse shaft $N^6$ and is inclosed in a recess $o'$ in the double lever. A cover $O^2$ for this recess can be tightened by means of bolts or screws $O^3$ to increase or diminish the amount of friction on the disk. By means of this device the friction of the disk $O$ will always tend to rotate the double lever and will always have this effect when the lever is released.

The mandrel feeding device operates in the following manner: The slotted lever $N^2$ operates and reciprocates the carriage $N$ and $N^5$ the double operating lever always acts in the same direction and is frictionally driven. It rotates in an anti-clockwise direction and is normally kept from rotating by the bell crank lever arms $N^{13}$. The long arm of the bell-crank lever rests against the underside of the mandrel $A$, while the said mandrel is being propelled by the driving mechanism of the machine. When the end of the mandrel which is being propelled gets beyond the end of the long arm of the bell-crank lever 13, the double operating lever, which is frictionally driven and which has up to this point been held by the short arm $N^{11}$ of the bell-crank, releases the double operating lever $N^5$. This lever $N^5$ is then free to rotate in an anti-clockwise direction, and the depressible spring point $N^9$ engages the cam $N^{10}$ and moves the operating lever $N^2$ and carriage $N$ forward and the plunger $N^1$ forces the fresh mandrel into connection with the mandrel immediately preceding in the machine. After this operation is completed the weight $N^{14}$ acts to return the slotted lever $N^2$ to its normal position after it becomes disengaged from the double operating lever $N^5$. When the free mandrel has been forced into position in engagement with the mandrel gripped between the rollers $E^2$ in the machine the depressible point $N^9$ passes on and engages the cam surface $N^{10}$ of the lever $N^2$ holding it in its forward position for a length of time sufficient for the mandrel which has just been pushed into engagement to travel beyond the point when the next mandrel rolling down into place would strike it, while the spring $N^{20}$ will prevent injury to the mandrel or to the plunger and will maintain a close engagement of the mandrels irrespective of the exact adjustment of the moving parts until the carriage is withdrawn. An adjustable stop $N^{23}$ secured in position upon the dovetailed projection $M^{17}$ by a set screw $N^{24}$ limits the forward movement of the carriage $N$, while the return movement of the carriage $N$ is limited by the stop pin $N^{25}$ in the lever $N^2$ and the pin $N^{26}$ in the bearing bracket for shaft $N^6$. To present the free mandrel in the right position so that the keyway therein will register with the key in the fixed register, the plunger $N'$ is provided with a spring-pressed and adjustable key $N^{21}$ alined with the keyway in the fixed mandrel. Means are also provided for rotating the free mandrel in its seat in the recess $M^{15}$ until the key in the plunger enters the keyway therein. This is accomplished by means of the curved arm $P$ which presses against and is moved across the free mandrel during the passage of the carriage. The arm $P$ is pivoted in a bracket $P^6$ on the cross bar $M^{16}$ upon a shaft $P'$ which is provided with an eccentric toe $P^2$ adapted to be engaged by a spring-pressed cam shaped pin $P^3$ on the carriage in such a manner as to rotate the arm $P$ when the carriage moves forward to insert the mandrel, while on the return movement of the carriage $N$ the cam pin $P^3$ is depressed by the eccentric toe $P^2$, the latter being prevented from rotating on this return movement by the stop pin $Q^3$. Stops $P^4$ and $P^5$ prevent the arm from falling by gravity too far on the return movement. The cam pin $P^3$ is adjusted by the threaded bushing $P^7$ and the nut $P^8$ and is prevented from rotating by the key $P^9$ engaging the keyway $P^{10}$ in the lug $P^{11}$ on the carriage $N$. The carriage is also provided with a spring pawl $Q$, see Fig. 71, which is adapted to engage a projection $Q'$ on one end of the rock arm $M^{13}$ and operate the releasing mechanism for the pins $M^9$, $M^9$, on the return movement of the carriage. A spring $Q^2$ returns the rock arm and replaces the releasing pins in time to allow only one mandrel to roll down to the concave surface $M^{15}$ of the transverse bar $M^{16}$.

The means for cutting the fabric transversely in sections of predetermined lengths is shown in Figs. 78 to 82 inclusive. This is accomplished by means of a cutting disk $R$ which revolves about the mandrel, and also rotates on its own axis. It is designed that the cutter should preferably revolve about the mandrel twice or more times if it is desirable for each mandrel length, so that each fabric section should preferably equal the mandrel in length, while also a forward movement is imparted to the cutter corresponding practically to the forward movement of the mandrel during the period of the cutting movement. The cutter R is mounted upon an arm $R'$ pivoted at $R^2$ upon a bevel gear $R^3$ which is supported by means of rollers $R^4$, $R^4$, pivoted upon the standard $R^5$. The gear $R^3$ is operated by means of the bevel gears $R^6$, and $R^7$ upon a shaft $R^8$ and a bevel gear $R^9$ upon the shaft $G^5$; as this gear $R^3$ revolves it carries the cutter and its support with it. The cutter is rotated in turn by means of the spur gears $R^{10}$, $R^{11}$ and $R^{12}$ the latter of which engages the stationary internal gear $R^{13}$ on the standard $R^5$. The gear $R^{11}$ is rotatably mounted upon the pivot shaft $R^2$ of the arm $R'$ and engages the gears $R^{10}$, $R^{12}$, so as to permit the arm to swing. The cutter R is normally held away from the fabric by means of a spring $R^{14}$ attached one end to the arm $R'$ and the other end to the pin $R^{41}$ on the gear $R^3$, and is brought into engagement therewith by means of a cam pin $R^{15}$ and a projection $R^{16}$ on the arm $R'$ at the required intervals, that is when the required length of hose has passed under the cutter. This cam pin $R^{15}$ is mounted in a bearing $R^{40}$ on the gear $R^3$, acting against the pressure of the spring $R^{47}$, adjusted by the nut $R^{48}$ and restrained from rotating by the key $R^{49}$ engaging the keyway $R^{50}$.

The rotation of the arm $R'$ by the spring $R^{14}$ is limited by the stop pin $R^{44}$ in the gear $R^3$. The mechanism for engaging the cutter with the fabric and for giving it the required forward movement corresponding in length to the length of the mandrel passing under the cutter while the act of cutting takes place, is preferably constructed as follows: $R^{17}$ is a roll engaging the mandrel and it has an engaging circumference equaling the length of one mandrel or hose section. The roll $R^{17}$ is mounted upon a shaft $R^{18}$ which has its upper bearing in a fork $R^{33}$ which in turn is mounted upon a pin $R^{54}$ which has a bearing in the bracket $R^{55}$ attached to the bracket $B^{12}$. The roll $R^{17}$ is pressed against the mandrel A, (which is sustained by an opposing roll $R^{32}$ in the same plane mounted upon another bearing of the bracket $R^{55}$) by a threaded bushing $R^{56}$ engaging a helical spring $R^{57}$ on the pin $R^{54}$, the roll thus being driven by friction with the mandrel A. The bracket $R^{55}$ is cut out at $R^{58}$ slightly larger than the shaft $R^{18}$ to allow the slight movement necessary to obtain the requisite pressure for operation of the roll $R^{17}$. Upon the shaft $R^{18}$ is also mounted a disk $R^{19}$ having a cam projection $R^{20}$ thereon. This projection engages a roller $R^{21}$ on a shaft $R^{22}$ which slides in bearings $R^{51}$ and which operates a bar $R^{23}$ connected by a pivot pin $R^{24}$ with a sleeve or member $R^{25}$ which is slidingly mounted within the gear $R^3$, the latter being free to rotate thereupon and is provided with a groove $R^{26}$ in which is inserted a pin $R^{27}$ secured in a collar fastened upon the pivot shaft $R^2$ of the arm $R'$. Thus as the cam $R^{20}$ pushes forward the bar $R^{23}$ it will also move forward the shaft $R^2$, the arm $R^7$, and the cutter R. The cutter will be brought into engagement with the fabric by means of the cam pin $R^{15}$ and the projection $R^{16}$ which will engage the former as the arm $R'$ moves forward. The cam pin $R^{15}$ is provided with one slanting face $R^{30}$ which raises the outer end of the arm $R'$ and depresses the cutter during the forward movement of the arm $R'$ while on the return movement of the arm by the shaft $R^2$ the rotation being stopped by the pin $R^{44}$ the projection $R^{16}$ engages another slanting face $R^{45}$ on the cam pin $R^{15}$ depressing it and passing over it. The shape of the cam $R^{20}$ determines the duration of the cut and also the forward movement of the cutter shaft and cutter. A spring $R^{31}$ acting against a set collar $R^{52}$ returns the bar $R^{23}$ and arm $R'$. In this manner the cutting mechanism is operated by the movement of the mandrel.

In Figs. 83 and 84 is shown the mechanism for cutting the fabric longitudinally upon the mandrel. In these views the cutting disk S is mounted upon a vertical shaft $S'$ and is operated by means of spur gears $S^2$ and $S^3$ and bevel gears $S^4$, $S^5$, $S^6$ and $S^7$, the last being upon the shaft $G^5$, and gears $S^5$ and $S^6$ being upon an intermediate shaft $S^8$, rotatably mounted in bearings in the standard $S^{14}$. The shaft $S'$ is preferably mounted upon a swinging arm $S^{10}$ pivoted on the shaft $S^{11}$ of the gear $S^3$ and adjustable for removal or adjustment of the cutter by means of the slotted extension $S^{12}$ and a screw or bolt $S^{13}$.

It is obvious that any predetermined prepared material may be substituted or utilized in place of the lining of sheet rubber on the mandrel without departing from the spirit of the invention or the scope of the claims.

It is obvious by adding to the length of the machine similar mechanism can be utilized for putting on the outside rubber covering and preparing the hose for vulcanization by wrapping the latter in suitable material under any desired tension requisite for that purpose.

It is obvious that a suitable electro-magnetic guiding device or other necessary means may be provided if advisable to prevent torsion or twist of the mandrel as it is propelled through the machine without departing from the spirit of the invention or the scope of the claims.

It is obvious that the general mechanism and arrangement of the machine herein described may be so altered, amended or changed that the mandrels may be stationary in predetermined lengths and that all of the applying devices, as described in this machine may be so arranged as to move parallel to the mandrel in either direction, while performing the necessary functions of constructing the tubular fabric of any character or design, or the machine may be so constructed the mandrel or mandrels may rotate in either direction and have a predetermined reciprocal longitudinal motion while the applying devices may be stationary, without in either case departing from the intent, purpose or spirit of the invention as herein described or the scope of the claims.

I have shown in the drawing and particularly described in the specification certain preferred embodiments of my invention, but these embodiments are to be regarded as illustrative only, and I do not intend to limit myself to the details thereof.

It is obvious that my invention is capable of many modifications, all of which are included within the scope of the claims.

Having described the invention what I claim as new and desire to secure by Letters Patent is:

1. In a machine for forming an unwoven fabric a longitudinally movable mandrel formed in sections, means for wrapping a calendered rubber band longitudinally thereon, a series of spaced reels rotatable about said mandrel, spools thereon, arranged to store and wind series of parallel spaced bands of rubbered cords on the mandrel, reels reversely rotatable about said mandrel, spools thereon arranged to store and wind series of parallel spaced bands of rubbered cords upon the mandrel at an angle to said first mentioned bands, and in alternate series therewith, whereby the bands of one series are interlaid with the bands of parallel series to cover the spaces therebetween, the movements of said rotatable reels and mandrel acting to form said fabric progressively and continuously on said mandrel, and means for automatically supplying fresh sections to the mandrel as it is fed to the machine.

2. In a machine for forming an unwoven fabric on a mandrel, a device for applying a band of calendered unvulcanized rubber longitudinally to the mandrel and shaping it to envelop the same, a series of spaced reels and spools thereon rotatable about said mandrel arranged to store and wind series of regularly spaced parallel bands of cords upon the mandrel at an angle thereto, a series of spaced reels and spools thereon rotatable about said mandrel adapted to store and wind regularly spaced parallel bands at an angle to said first named series of bands, and in alternately laid laminations therewith, the spaces between the parallel regularly spaced bands in one series being filled by the parallel spaced bands subsequently laid at the same angle and in the same direction, a longitudinally movable mandrel, means for propelling the mandrel at a predetermined rate of speed relative to the speed of rotation of said rotatable reels, and automatically operating means for giving the required direction of movement and rate of speed to the rotatable reels, the speed of the several reels decreasing as the fabric increases in diameter.

3. In a machine for forming an unwoven tubular fabric upon a mandrel, the combination with a sectional mandrel, of a series of spaced disk shaped reels rotatable about the mandrel, spools rotatably secured upon the said reels, adapted to store bands of rubbered cords, a guide and tension device for each band adapted to apply the band to said mandrel under predetermined amount of tension, said reels revoluble alternately in opposite directions, the spools and guides on each reel arranged to apply the bands in regularly spaced parallel rows upon said mandrel, means for supporting said mandrel and for propelling said mandrel at a predetermined rate of speed, mechanism for supporting said reels and for rotating said reels at predetermined speeds relative to the progressive speed of the mandrel, the speed of the reels being progressively less as the fabric increases in diameter.

4. In a machine for the manufacture of a fabric hose, a series of mandrels secured together and having a longitudinal axial movement, diametrically opposite rolls adapted to engage and propel the mandrel, means for adjusting the pressure of said rolls, means for automatically operating said rolls, diametrically opposite adjustable pressure rollers, adapted to prevent the mandrel from rotating on its axis, adjustable supporting rollers for the mandrel, and supports for said rolls and rollers, substantially as described.

5. In an automatically acting machine for the manufacture of a fabric hose, a sectional mandrel comprising a series of mandrels secured together end to end, friction drive mechanism for giving a continuous longitudinal movement thereto, means for preventing the rotation of the mandrel in its longitudinal axis, means for feeding mandrels and for attaching them together in succession in the machine.

6. In an automatically acting machine for the manufacture of a fabric hose, a sectional mandrel, mechanism for supporting said mandrel, for propelling the same at a predetermined rate of speed, and for preventing the same from rotating on its axis, mechanism rotatable about the mandrel for applying bands of cords in parallel rows upon said mandrel at a predetermined angle, mechanism rotatable in the reverse direction for applying bands of cords in parallel rows upon said mandrel at an angle to said first mentioned rows of bands, the mechanism for applying bands of cords in one direction alternating with the mechanism for applying bands of cords in the other direction.

7. In an automatically acting machine for the manufacture of a fabric hose, a longitudinally moving mandrel, adjustable means for propelling and supporting the same, means for preventing the rotation of the mandrel, means for applying a band of unvulcanized rubber on one side of the mandrel separate adjustable means for wrapping the same about the mandrel and a pressure device for sealing the overlapping edges thereof.

8. In an automatically acting machine for the manufacture of a fabric hose, a longitudinally moving mandrel, adjustable means for propelling and supporting the mandrel and for preventing the rotation thereof, means for inclosing the mandrel in a band of unvulcanized rubber, mechanism rotatable about the mandrel for applying spaced parallel bands of rubbered cords thereon in one direction, mechanism alternating with the aforesaid mechanism and rotatable in the opposite direction about said mandrel for applying spaced parallel beands of rubbered cords thereon at an angle to said first mentioned bands, whereby a laminated fabric is constructed, and operating means for reducing the rotating speed of the said mechanisms as the fabric on the mandrel increases in diameter.

9. In a machine of the character described, a tubular mandrel therefor adapted to be attached to similar mandrels, comprising a tubular body, provided with opposite keyways, at its ends, a plug for one end thereof provided with a corresponding key at each end, said plug provided with a central cylindrical portion, adapted to separate two mandrles when they are attached together, and screw threaded closures for the inner opening of the mandrel, said closures and plug provided with central screw threaded openings, and the said plug provided with annular recesses and longitudinal grooves, substantially as and for the purposes described.

10. A mandrel adapted for attachment to and detachment from a preceding and following mandrel and upon which a rubber fabric is wound, a cylindrical body, provided with a central opening and with a keyway at each end in said opening, in combination with a reversible plug having an enlarged central portion of the same diameter as the mandrel, and extremities adapted for insertion in the mandrel and in the adjacent mandrel, each extremity provided with a key, said plug provided with an annular recess adjacent to said enlarged central portion, and with longitudinal grooves in said extremities, a closure spaced from each end of said mandrel, said plug and closures provided with central openings, a screw threaded rod adapted to pass through said openings and securing means therefor and means for closing the open end of the mandrel and for closing and sealing the extremities of the rubber fabric.

11. A sectional mandrel, comprising a series of mandrels arranged end to end, in combination with a series of plugs, each plug provided with a central portion of the same diameter as the mandrels adapted to separate two of them, and also provided with extremities adapted to enter adjacent mandrels, and means for alining the plugs and mandrels.

12. In combination with a mandrel, mechanism for storing and applying coiled bands of cohering cords in spaced parallel rows upon said mandrel, said coiled bands of cords alternating with non-adhering bands for separating the coils of bands in storage upon the band applying mechanism, means for removing the non-adhering bands coacting with the means for applying the bands, and means for rotating one set of mechanism relatively to the other set of mechanism, and for advancing one set of mechanism, whereby the said spaced bands are wound at an angle upon said mandrel.

13. In combination with a mandrel, sets of mechanism for storing bands of cords, from which said bands are wound upon said mandrel in spaced parallel rows at an angle thereto, similar sets of storing mechanism from which similar bands are wound upon the mandrel in spaced parallel rows at an angle to said previously mentioned rows of bands, one set of mechanism alternating with the other set longitudinally of the mandrel, said coiled bands of cords alternating with non-adhering bands upon which said bands of cords are wound in said storing mechanism, automatically acting devices for removing said non-adhering bands when the bands are wound upon the mandrel, and means for giving relatively longitudinal and rotary movements to said storing devices and mandrel, whereby said storing devices operate to wind the said bands of cords continuously from end to end of said mandrel.

14. In a machine for making a laminated fabric, a sectional mandrel, devices for applying bands of cohering cords to said mandrel in parallel spaced rows, said devices spaced apart longitudinally of the mandrel, one device adapted to lay spaced bands of cords intermediate of the bands laid by the other device, a second series of devices alternating therewith for applying similar spaced bands of cohering cords at an angle to the bands laid by said first named devices, one of said second series of devices adapted to lay the bands intermediate of the bands laid by another of said second series of devices, means for guiding said bands from said band applying devices to said mandrel and for placing said bands of cords under tension, and automatically operating devices for applying fresh sections to said mandrel as it is fed through said machine.

15. In a machine of the character described, a longitudinally moving mandrel, a mechanism for propelling said mandrel at a predetermined rate of speed, a series of devices rotatable about the mandrel, and adapted to apply spaced parallel bands of cohering cords continuously thereto, at an angle as said mandrel moves, said rotatable devices spaced along the mandrel, the said devices after the first one adapted and arranged to lay said spaced bands intermediate of the bands previously laid, a series of band laying devices rotatable about the mandrel in the opposite direction to the first named series of band laying devices, the bands laid by said second series being similarly interlaid with each other, the devices of one series being interpositioned between the devices of the other series and means for automatically rotating the devices of both said series at predetermined rates of speed relative to the rate of speed of the mandrel, said means adapted to vary the speed of said band applying devices, relatively to the thickness of the fabric constructed upon the mandrel.

16. In a machine for making an unwoven laminated tubular fabric, from bands of cohering cords, a longitudinally movable mandrel, a series of reels, spaced thereover and rotatable thereabout, spools spaced thereon, upon which the bands of cords are wound, interposed with bands of non-adhesive material, guiding and friction providing devices for the bands of cords, storage spools upon said reels upon which said bands of non-adhesive material are automatically wound as they leave the first mentioned spools, said storage spools operatively connected with said spools upon which said bands of cord are wound, mechanism for alternately rotating said reels in opposite directions and at predetermined rates of speed relatively to the speed of the mandrel substantially as described.

17. In a machine for the purpose described, a longitudinally movable mandrel, a series of reels rotatable about the mandrel and provided with toothed edges, spaced spools, guides, and friction devices on said reels, rollers on which said reels are mounted, a common driving shaft for said series of reels, a set of gears for each reel operatively connected with said shaft, said gears arranged to rotate alternate reels in opposite directions, and at different speed, a main driving shaft, gears connecting said common and main driving shafts, diametrically opposite rolls, engaging said mandrel, adjustable speed mechanism for rotating said rolls at an equal rate of speed, said mechanism operatively connected with said main shaft.

18. In a mandrel supporting and driving device, a series of standards, rollers adjustably secured in each standard on which the mandrel is supported, one of said rollers being centrally underneath said mandrel, diametrically opposite rolls engaging said mandrel, rock arms upon which said rolls are pivotally mounted, gears on the pivotal shafts of said rolls, vertical shafts on which said rock arms are mounted, engaging gears on said shafts and gears engaging therewith on said pivotal shafts for the rolls, means for adjusting the tension on said rolls, and adjustable driving mechanism for one of said vertical shafts.

19. In a machine of the character described, a mandrel, oppositely placed rolls, engaging the mandrel, oppositely placed rock arms, pivotal shafts therein for said rolls, a frame on which said rock arms are mounted, shafts therein on which said arms are pivoted, gears on the pivotal shafts for the rolls, gears engaging therewith and with each other mounted on the shafts in said frame, main driving shaft and gear shaft, adjustable friction driving mechanism operatively connecting said main shaft and gear shaft, and gears operatively connecting said gear shaft and one of the said shafts in said frame, the aforesaid mechanism adapted to propel said mandrel at a predetermined rate of speed.

20. In a machine of the character described, a mandrel, a pair of opposite engaging rollers, means for rotating said rollers at a predetermined equal rate of speed, and a pair of radially adjustable pressure rollers adapted to grip the mandrel at diametrically opposite points, and a plurality of supporting rollers having concave edges, whereby the rotation thereof is prevented, the internal diameter of each concavity being less than that of the said mandrel.

21. In a machine of the character described, a mandrel, mechanism for propelling the mandrel at a predetermined rate of speed, mechanism for preventing the mandrel from rotating on its axis, a device for coating the mandrel with material adapted to prevent adhesion of the lining thereto, mechanism for applying a band of unvulcanized rubber thereto, for forming the same in a continuous manner about the mandrel and for sealing the overlapping edges, substantially as described.

22. A longitudinally moving sectional mandrel, a series of reels encircling the mandrel, and rotatable thereabout, a series of similar reels rotatable about the shaft in the opposite direction, a common operating shaft for said reels, adjustable operating means for each reel operatively connected with said driving shaft, whereby said reels can automatically and severally be rotated at predetermined rates of speed, and in a predetermined direction of movement, and means for automatically supplying fresh sections to said mandrel, as the same is fed through the machine.

23. In combination, a longitudinally movable sectional mandrel, composed of detachable sections, devices rotatable about said mandrel for winding threads thereon, automatically operating means for attaching fresh sections to said sectional mandrel as it passes through said machine and automatically operating means for propelling said mandrel.

24. In a device for coating the mandrel, a storage reel upon which a band of unvulcanized rubber and an interposed flexible band of non-adhesive substance are wound, a bracket, a roller on said bracket over which the rubber and interposed band are drawn, means for separating and storing said interposed band, a curved horizontal roller over which the rubber band passes, and by means of which said rubber band is applied to the mandrel, curved vertical rollers adapted to compress said band about the sides of the mandrel, a vertical roller underneath the mandrel, a series of inclined rollers about the mandrel adapted to form the band upwardly and over the top of the mandrel and a vertical pressure roller adapted to compress and seal the overlapping edges of said band.

25. In a device for coating a longitudinally moving mandrel a reel upon which are wound a band of unvulcanized rubber and an interposed band of non-adhesive material, a roller over which said bands pass, a pair of pulling rolls between which said non-adhesive band passes and by means of which it is separated from the rubber band, a spool upon which the non-adhesive band is wound, and rollers arranged to compress the rubber band upon the lower edge lateral sides and upper side of the mandrel as said mandrel progresses.

26. In a machine of the character described, a longitudinally movable mandrel, horizontal diametrically opposite propelling rolls, means for rotating said rolls at an equal rate of speed, vertical diametrically opposite pressure rollers, supports therefor, and adjustable supporting rollers for the mandrel, arranged in spaced groups of three, one roller in such group being vertically underneath the mandrel, spaced supports for said groups of rollers, said rollers having concave engaging surfaces, and the curved engaging surfaces of said pressure rollers being of less radius than the radius of said mandrel.

27. In a machine of the character described, a longitudinally movable cylindrical mandrel, horizontal propelling rolls and mechanism for operating the same at an equal rate of speed, vertical pressure rollers engaging the mandrel upon opposite sides, said rolls having curved engaging surfaces, the radius of which is less than the radius of the mandrel, and adjustable supporting rollers, arranged in spaced groups and supports for said rollers, some of said supporting rollers having curved engaging surfaces of smaller radius than the radius of said mandrel.

28. The combination with a longitudinally movable mandrel, of propelling means therefor, and adjustably mounted pressure rollers, engaging the mandrel at diametrically opposite points, the engaging surfaces of said pressure rollers having a radius less than the radius of said mandrel, said rollers having friction engaging surfaces.

29. In an automatically acting machine for the manufacture of a fabric hose, a longitudinally moving mandrel, adjustable means for propelling and supporting the mandrel and for preventing the rotation thereof, means for inclosing the mandrel in a band of unvulcanized rubber, mechanism rotatable about the mandrel for applying spaced parallel bands of rubbered cords thereon in one direction, mechanism alternating with the aforesaid mechanism and rotatable in the opposite direction about said mandrel for applying spaced parallel bands of rubbered cords thereon at an angle to the said first mentioned bands, whereby a laminated fabric is constructed, and operating means for compensating for the speed of the said mechanism as the fabric on the mandrel increases in diameter.

30. In a mandrel supporting means, a plurality of rollers spaced about the mandrel therein, a standard, a lower roller centrally mounted underneath the mandrel, spaced split bosses in the standard, screw threaded bushings therein, clamped in said bosses, a spring fork in the bushing for the lower roller, and roller therein, said fork adapted to turn in said bushing, forks clamped in the other bushings and rollers in said forks, and means for preventing the said forks in the other bushings from turning.

31. In combination with a longitudinally moving mandrel, a reel rotatable thereabout, means for rotating the reel and for propelling the mandrel at predetermined relative rates of speed, a support in which said reel is rotatable, spools regularly spaced and pivoted upon said reel upon which spools bands of cohering cords and interposed bands of non-adhesive material are wound, spools for said strips of non-adhesive material adjacent to the aforesaid spools and operatively connected thereby upon which said bands of non-adhesive material are wound as the bands are withdrawn and tension and guiding mechanism for the bands.

32. In combination with a reel, a series of equally spaced spools therein, upon which are coiled bands of cohering cords and interposed bands of non-adhesive material, storage spools for the said non-adhesive bands adjacent to aforesaid spools, geared connection between both sets of spools, whereby when the spools for both bands of cords and bands of non-adhesive material are revolved, the bands of non-adhesive material will be wound on said storage spools, guiding and tension devices for the bands of cohesive cords, and a friction driving device for each of said storage spools, adapted to slip as the diameter of the roll of non-adhesive material increases on the said storage spools.

33. In a machine employing a sectional mandrel, a sectional mandrel, an inclined support for a series of free mandrels, means for maintaining them in alinement while traversing their support, means for automatically detaching one mandrel at a time from said series of mandrels, a frame, a shoulder therein against which said detached mandrel rests, a reciprocable carriage, a spring pressed plunger therein in alinement with the axis of the sectional mandrel in the machine, adapted to engage and move said detached mandrel forward to engage the mandrel located in front in the machine, means for giving a reciprocating movement to the mandrel and means for controlling the forward movement of the carriage, said means controlled by the last mandrel inserted in the machine.

34. In a machine employing a sectional mandrel, an inclined support on which free mandrels roll by gravity, mechanism for detaching one mandrel at a time from the free mandrels on said support, a frame, a recessed shoulder thereon against which said detached mandrels roll by gravity into alinement with said sectional mandrel in said machine, a carriage reciprocable in said frame, a spring pressed plunger thereon, in alinement with the longitudinal axis of said sectional mandrel, a slotted arm engaging said carriage, a weight adapted to normally hold said arm and carriage in the retracted position, a friction operated lever adapted to move said arm against the power of said weight, and a bell crank lever one arm of which engages and retains said friction operated lever from movement and the other arm engages the mandrel last placed in the machine, said bell crank adapted to release said friction operated lever to operate said slotted lever as soon as said last placed mandrel passes the engaging arm, and automatically acting devices for moving said sectional mandrel longitudinally of its axis, for operating said mandrel detaching device, and for operating said friction operated arm.

35. In a device for operating a mandrel feeding device, to add a fresh mandrel to a longitudinally moving sectional mandrel, a reciprocable carriage, a spring pressed plunger therein, a pivoted arm for operating said carriage in one direction, a weight adapted to return said carriage, said arm provided with a cam surface, a friction operated double lever and spring points therein, said points adapted to engage said cam alternately, a bell crank, one arm of which is engaged by one of said spring points, and the other arm engages the mandrel last placed in the machine.

36. In a mandrel feeding device adapted to attach fresh mandrels in turn to a sectional mandrel, an inclined support, a mandrel detaching device, a frame, a carriage reciprocable thereon, a shoulder against which the detached mandrel rests, a spring pressed plunger in said carriage in line with said detached mandrel, when resting against said shoulder, a mandrel rotating device, and mechanism for reciprocating said carriage, said mechanism controlled by the movements of the nearest mandrel in said sectional mandrel.

In testimony whereof, I hereunto set my hand this 12th day of November 1910.

LAWRENCE A. SUBERS.

In presence of—
ERNEST MOSMAN,
ADAM MEYER.